United States Patent
Gillis et al.

(10) Patent No.: US 8,934,480 B2
(45) Date of Patent: Jan. 13, 2015

(54) ENRICHING TRAFFIC DATA IN A TELEPHONE NETWORK

(71) Applicant: Verizon Patent and Licensing Inc., Basking Ridge, NJ (US)

(72) Inventors: Raymond A. Gillis, Melrose, MA (US); Robert E. Ritter, North Andover, MA (US); Timothy A. Raughley, Syracuse, NY (US); Venkatasathya Pasupulati, Shrewsbury, MA (US); Carol B. Snow, Northbridge, MA (US); Douglas C. Smith, Cambridge, MA (US); Kevin Brand, Flower Mound, TX (US); Paula Hartnett, East Weymouth, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 79 days.

(21) Appl. No.: 13/846,942

(22) Filed: Mar. 18, 2013

(65) Prior Publication Data
US 2014/0269679 A1 Sep. 18, 2014

(51) Int. Cl.
*H04L 12/66* (2006.01)
*H04M 15/00* (2006.01)

(52) U.S. Cl.
CPC .............. *H04M 15/49* (2013.01); *H04M 15/56* (2013.01)
USPC ....................................................... 370/352

(58) Field of Classification Search
CPC ..................................................... G06Q 20/16
USPC ........................................................ 370/352
See application file for complete search history.

(56) References Cited

U.S. PATENT DOCUMENTS

| | | | |
|---|---|---|---|
| 4,456,788 A | 6/1984 | Kline et al. |
| 4,464,543 A | 8/1984 | Kline et al. |
| 4,760,594 A | 7/1988 | Reed |
| 4,788,718 A | 11/1988 | McNabb et al. |
| 5,008,929 A | 4/1991 | Olsen et al. |
| 5,285,494 A | 2/1994 | Sprecher et al. |
| 5,333,183 A | 7/1994 | Herbert |
| 5,359,649 A | 10/1994 | Rosu et al. |
| 5,425,087 A | 6/1995 | Gerber et al. |
| 5,434,845 A | 7/1995 | Miller |
| 5,438,570 A | 8/1995 | Karras et al. |
| 5,457,729 A | 10/1995 | Hamann et al. |
| 5,475,732 A | 12/1995 | Pester, III |
| 5,483,590 A | 1/1996 | Chiu et al. |
| 5,563,930 A | 10/1996 | Pester, III |
| 5,579,371 A | 11/1996 | Aridas et al. |
| 5,592,530 A | 1/1997 | Brockman et al. |
| 5,642,396 A | 6/1997 | Cowgill |
| 5,692,181 A | 11/1997 | Anand et al. |

(Continued)

*Primary Examiner* — Asad Nawaz
*Assistant Examiner* — Syed S Ali

(57) ABSTRACT

A processor is configured to receive call records from telecommunication network and load the call records into a telephone number (TN) list. Local Routing Number (LRN) data identifying ported numbers are obtained from a reference database and applied to the call records to enrich the call records with ported information. Also, Local Exchange Routing Guide (LERG) data associated with the LRN data are obtained from the reference database and applied to the call records to enrich the call records with LERG information. Based on the LERG information, an originating carrier from a routing carrier for the call records is distinguished. The originating carrier is a carrier originating a call and passing the call to the routing carrier for delivery to its final destination. The ownership to the call records are assigned based on the originating carrier.

14 Claims, 12 Drawing Sheets

(56) References Cited

U.S. PATENT DOCUMENTS

| | | | |
|---|---|---|---|
| 5,712,908 A | 1/1998 | Brinkman et al. |
| 5,715,294 A | 2/1998 | Pester, III |
| 5,724,584 A | 3/1998 | Peters et al. |
| 5,737,399 A | 4/1998 | Witzman et al. |
| 5,757,895 A | 5/1998 | Aridas et al. |
| 5,768,352 A | 6/1998 | Elliott et al. |
| 5,774,530 A | 6/1998 | Montgomery et al. |
| 5,793,839 A | 8/1998 | Farris et al. |
| 5,802,145 A | 9/1998 | Farris et al. |
| 5,809,120 A | 9/1998 | Montgomery et al. |
| 5,825,769 A | 10/1998 | O'Reilly et al. |
| 5,828,729 A | 10/1998 | Clermont et al. |
| 5,835,583 A | 11/1998 | Hetz et al. |
| 5,838,682 A | 11/1998 | Dekelbaum et al. |
| 5,838,769 A | 11/1998 | McNeil et al. |
| 5,838,796 A | 11/1998 | Mittenthal |
| 5,844,981 A | 12/1998 | Pitchford et al. |
| 5,850,426 A | 12/1998 | Watkins et al. |
| 5,852,819 A | 12/1998 | Beller |
| 5,854,834 A | 12/1998 | Gottlieb et al. |
| 5,854,835 A | 12/1998 | Montgomery et al. |
| 5,864,608 A | 1/1999 | Brownmiller et al. |
| 5,867,558 A | 2/1999 | Swanson |
| 5,867,565 A | 2/1999 | Morikawa |
| 5,875,238 A | 2/1999 | Glitho et al. |
| 5,881,140 A | 3/1999 | Gerault et al. |
| 5,896,445 A | 4/1999 | Kay et al. |
| 5,901,208 A | 5/1999 | Jabbarnezhad |
| 5,905,785 A | 5/1999 | Dunn et al. |
| 5,905,985 A | 5/1999 | Malloy et al. |
| 5,907,603 A | 5/1999 | Gallagher et al. |
| 5,917,898 A | 6/1999 | Bassa et al. |
| 5,933,490 A | 8/1999 | White et al. |
| 5,937,042 A | 8/1999 | Sofman |
| 5,940,471 A | 8/1999 | Homayoun |
| 5,949,862 A | 9/1999 | Fukuzawa et al. |
| 5,999,604 A | 12/1999 | Walter |
| 6,011,838 A | 1/2000 | Cox |
| 6,052,447 A | 4/2000 | Golden et al. |
| 6,052,448 A | 4/2000 | Janning |
| 6,067,354 A | 5/2000 | Bauer et al. |
| 6,075,848 A | 6/2000 | Lunn et al. |
| 6,078,647 A | 6/2000 | D'Eletto |
| 6,112,238 A | 8/2000 | Boyd et al. |
| 6,141,412 A | 10/2000 | Smith et al. |
| 6,744,866 B1 | 6/2004 | Nolting et al. |
| 6,937,993 B1 * | 8/2005 | Gabbita et al. ............... 705/7.22 |
| 2004/0174974 A1 * | 9/2004 | Meek et al. ............... 379/210.02 |
| 2005/0111640 A1 * | 5/2005 | Moisey et al. ............. 379/114.2 |
| 2005/0216380 A1 * | 9/2005 | Morris et al. .................... 705/34 |
| 2008/0119163 A1 * | 5/2008 | Marsh et al. .................... 455/408 |
| 2009/0310773 A1 * | 12/2009 | Long et al. .................... 379/219 |
| 2011/0038468 A1 * | 2/2011 | Hannan et al. ........... 379/112.01 |
| 2012/0173537 A1 * | 7/2012 | Shaffer et al. ................. 707/741 |
| 2013/0196697 A1 * | 8/2013 | Lew et al. ...................... 455/466 |

* cited by examiner

| VERIZON ORIGINATING OCN REPORT FIELD DESCRIPTIONS 710 | |
|---|---|
| DELIVERING CARRIER | THE CARRIER SWITCH OWNER TO WHOM VERIZON PASSES |
| OCN CARRIER | TERMINATING NUMBER OWNER |
| PEG | THE NUMBER OF CALL ATTEMPTS REGISTERED |
| MOU | MINUTES OF USE BASED ON CARRIER CONNECT TIME |
| % MOU | THE MOU PERCENTAGE OF THE GRAND TOTAL MOU FOR THE STUDY PERIOD |
| % DIRECT/INDIRECT MOU | EACH TOP 25 CARRIER'S PERCENTAGE OF TOTAL DIRECT OR INDIRECT TRAFFIC |
| JURISDICTION | THE BILLING JURISDICTION BASED ON THE RATE CENTER AND OWNERSHIP RELATIONSHIP BETWEEN DIALING AND DIALED |
| DIRECTLY TERMINATED | TRAFFIC THAT PASSES BETWEEN THE REPORTED CARRIER'S SWITCH AND A VERIZON SWITCH |
| DIRECTLY TERMINATED TOP 25 BASED ON MOU | TOP 25 DIRECTLY TERMINATED CARRIERS BASED ON MOU |
| BALANCE OF DIRECTLY TERMINATED MOU | SUM OF MOU FOR CARRIERS, EXCLUDING THE TOP 25 |
| TOTAL DIRECT | SUM OF "TOP 25" AND "BALANCE OF MOU" |
| INDIRECTLY TERMINATED | NOT THE REPORTED CARRIER, TO WHOME VERIZON PASSES TRAFFIC, WHERE THE TERMINATING NUMBER OWNER IS THE REPORTED CARRIER |
| CARRIER TERMINATED INDIRECTLY VIA TOP 25 CARRIERS BASED ON MOU | TOP 25 INDIRECTLY TERMINATED CARRIERS BASED ON MOU |
| BALANCE OF INDIRECTLY TERMINATED MOU | SUM OF INDIRECT MOU FOR CARRIERS, EXCLUDING THE TOP |
| TOTAL INDIRECT | SUM OF INDIRECT "TOP 25" AND "BALANCE OF MOU" |
| TOTALS | SUM OF MOU FOR EACH ROW OR COLUMN |

| VERIZON TERMINATING OCN REPORT FIELD DESCRIPTIONS 712 | |
|---|---|
| DELIVERING CARRIER | THE CARRIER SWITCH OWNER PASSING TRAFFIC TO VERIZON, BASED ON |
| OCN CARRIER | ORIGINATING NUMBER OWNER |
| PEG | THE NUMBER OF CALL ATTEMPTS REGISTERED |
| MOU | MINUTES OF USE BASED ON CARRIER CONNECT TIME |
| % MOU | THE MOU PERCENTAGE OF THE GRAND TOTAL MOU FOR THE STUDY PERIOD |
| % DIRECT/INDIRECT MOU | EACH TOP 25 CARRIER'S PERCENTAGE OF TOTAL DIRECT OR INDIRECT TRAFFIC |
| JURISDICTION | THE BILLING JURISDICTION BASED ON THE RATE CENTER AND OWNERSHIP RELATIONSHIP BETWEEN DIALING AND DIALED |
| DIRECTLY TERMINATED | TRAFFIC THAT PASSES BETWEEN THE REPORTED CARRIER'S SWITCH AND A VERIZON SWITCH |
| DIRECTLY TERMINATED TOP 25 BASED ON MOU | TOP 25 DIRECTLY TERMINATED CARRIERS BASED ON MOU |
| BALANCE OF DIRECTLY TERMINATED MOU | SUM OF MOU FOR CARRIERS, EXCLUDING THE TOP 25 |
| TOTAL DIRECT | SUM OF "TOP 25" AND "BALANCE OF MOU" |
| INDIRECTLY TERMINATED | A THIRD PARTY CARRIER, NOT THE REPORTED CARRIER, PASSING TRAFFIC TO VERIZON, WHERE THE ORIGINATING NUMBER OWNER IS THE REPORTED CARRIER |
| CARRIER TERMINATED INDIRECTLY VIA TOP 25 CARRIERS BASED ON MOU | TOP 25 INDIRECTLY TERMINATED CARRIERS BASED ON MOU |
| BALANCE OF INDIRECTLY TERMINATED MOU | SUM OF INDIRECT MOU FOR CARRIERS, EXCLUDING THE TOP |
| TOTAL INDIRECT | SUM OF INDIRECT "TOP 25" AND "BALANCE OF MOU" |
| TOTALS | SUM OF MOU FOR EACH ROW OR COLUMN |

FIG. 7A

| VERIZON ORIGINATING/TERMINATING LIB DETAIL REPORT FIELD DESCRIPTIONS 720 | |
|---|---|
| CARRIER | CARRIER [CLEC] NAME |
| CARRIER CODE | ABBREVIATED CARRIER NAME AND LATA OF OPERATION ASSIGNED BY THE TRAFFIC TRACK SYSTEM TO LABEL AND GROUP CALL DETAIL RECORDS BASED ON |
| POINT CODE | AN SS7 TERM FOR A UNIQUE 9-DIGIT CODE WHICH IDENTIFIES A SWITCHING NODE IN ORDER FOR THE SS7 NETWORK TO ROUTE CALLS PROPERLY |
| CLLI | 11 CHARACTER ABBREVIATION FOR THE CARRIER'S SWITCHING NODE |
| CALLED STATE | STATE DETERMINED BY THE LATA OF |
| LATA | LOCAL ACCESS AND TRANSPORT AREA |
| PLU | PERCENT LOCAL USAGE: CALCULATED = DERIVED LOCAL MOU/(DERIVED LOCAL MOU + DERIVED INTRASTATE INTRALATA MOU + DERIVED INTERSTATE INTRALATA MOU) |
| SYSTEM UPTIME | THE PERCENTAGE OF TIME IN THE MONTH THE SYSTEM WAS COLLECTING CDR, BASED ON TOTAL HOURS IN THE MONTH AND DETERMINED BY THE |
| # DAYS COLLECTED | NUMBER OF DAYS DATA WAS COLLECTED FOR EACH CARRIER DURING THE MONTH |
| % FACTORED | = UNKNOWN MOU/TOTAL BILLABLE MOU |
| TOTAL TRANSIT | TOTAL TRANSIT CALLS - ALL JURISDICTIONS |
| TOTAL BILLABLE | TOTAL UNKNOWN + TOTAL KNOWN |
| TOTAL MOU | TOTAL COLLECTED MOU ON THE TRAFFIC TRACK SYSTEM, LESS ACCESS TRANSIT AND TOLL FREE |
| OBSERVED MOU | TRAFFIC WHERE THE NPA/NXX IS KNOWN AND JURISDICTION IS DIRECTLY ASSIGNED BASED ON THE RELATIONSHIP BETWEEN THE CALLING AND CALLED NPA/NXXS IN REFERENCE TABLES |
| FACTORED MOU | ASSIGNS A PROPORTIONATE AMOUNT OF UNKNOWN MOU TO A TRAFFIC JURISDICTION BASED ON THE PERCENTAGE OBSERVED IN THAT |
| DERIVED MOU | TOTAL OBSERVED + FACTORED FOR THE EACH JURISDICTION |
| EXTRAPOLATED MOU | ((DERIVED MOU/# DAYS COLLECTED)* DAYS IN MONTH)/SYSTEM UPTIME |
| LOCAL | NON-TRANSIT: LOCAL |

TO FIG. 7B-2

| VERIZON ORIGINATING/ TERMINATING COMCAST FDV VoIP REPORT FIELD DESCRIPTIONS 722 | |
|---|---|
| MMYYYY | MONTH AND YEAR REPORTED |
| TT CARRIER CODE | ABBREVIATED CARRIER NAME AND LATA OF OPERATION ASSIGNED BY THE TRAFFIC TRACK SYSTEM TO LABEL AND GROUP CALL DETAIL RECORDS |
| DIRECTION | FROM VERIZON TO CLEC; OR TERMINATING (T) TO VERIZON BASED ON VZ POINT CODE IN THE CDR |
| CALLING SWITCH | CALLING POINT CODE |
| CALLING SWITCH | CALLING SWITCH CLLI |
| CALLING SWITCH | CALLING SWITCH STATE |
| CALLING SWITCH LATA | CALLING SWITCH LATA |
| CALLED SWITCH | CALLED SWITCH POINT CODE |
| CALLED CLLI | CALLED SWITCH CLLI |
| TOLL FREE FLAG | TOLL FREE Y/N |
| LIB_BV_JUR | BILLING JURISDICTION |
| TOTAL CALLS | TOTAL PEG COUNT, VERIZON FDV CALLS ONLY |
| TOTAL MOU | TOTAL MOU BASED ON TOTAL CONNECT TIME, VERIZON FDV CALLS ONLY |

FIG. 7B-1

FROM FIG. 7B-1

| | |
|---|---|
| INTRASTATE INTRALATA | NON-TRANSIT INTRASTATE INTRALATA |
| INTRASTATE INTERLATA | NON-TRANSIT INTRASTATE INTERLATA |
| INTERSTATE INTRALATA | NON-TRANSIT INTERSTATE INTRALATA |
| INTERSTATE INTERLATA | NON-TRANSIT INTERSTATE INTERLATA |
| MISSING | NPA/NXX IS INCOMPLETE, INVALID, AND NOT IN REFERENCE TABLES |
| NO CPN | NO CALLING PARTY NUMBER (CPN) DELIVERED |
| TOTAL KNOWN MOU | OBSERVED (LOCAL + INTERSTATE INTERLATA + INTERSTATE INTRALATA + INTRASTATE INTERLATA + INTRASTATE INTRALATA |
| TOTAL UNKNOWN MOU | NO CPN + MISSING |
| TRANSIT TRAFFIC DETERMINATION (ORIG PORTING): CLEC TO VZ | IF CIC CODE IS PRESENT, TRANSIT FLAG IS SET TO TRUE "T"; OR IF TERMINATING NUMBER (TNUM) OCN IS NON-VERIZON, TRANSIT FLAG IS SET TO TRUE |
| TRANSIT TRAFFIC DETERMINATION (ORIG PORTING); VZ TO CLEC | IF ORIGINATING NUMBER (ONUM) IS A NON-VERIZON OCN, THE TRANSIT FLAG IS SET TO "T". ONUM IS DESIGNED TO IDENTIFY CALL OWNERSHIP AND IS ASSIGNED IN A HIERARCHY WHEN A VALID TELEPHONE NUMBER IS POPULATED IN THE CDR FIELD IN THIS ORDER: INTERNATIONAL NUMBER, PORTED FORWARD NUMBER, FORWARD NUMBER, PORTED CPN, CPN, PORTED CHARGE, CHARGE, JIP. IF THE FIRST FIELD IS NULL, I.E. INTERNATIONAL NUMBER, THE LOGIC MOVES TO THE NEXT FIELD IN THE SEQUENCE UNTIL A VALID NUMBER IS |

FIG. 7B-2

VERIZON ORIGINATING/TERMINATING
FULL INTERCONNECTION REPORT                                           730

| STUDIED CARRIER | CARRIER NAME UNDER STUDY |
|---|---|
| VZT CALL FLOW DIRECTION | DIRECTION: O = VZ TO CARRIER, T = CARRIER TO VZ; CALL FLOW: DIRECT = ROUTED BETWEEN STUDIED CARRIER SWITCH AND VERIZON SWITCH; INDIRECT = NOT ROUTED BETWEEN STUDIED CARRIER AND VERIZON |
| CALL FLOW TYPE | ADDITIONAL INFORMATION ON TN OWNERSHIP OF ORIGINATING NUMBER (DIR T) OR TERMINATING NUMBER (DIR O) |
| VZT TO 3RD PARTY DIRECT-DIRECT O | TRAFFIC THAT PASSES FROM VZ-T TO THE CARRIER SWITCH UNDER STUDY, BUT THE CALLED NUMBER IS NOT OWNED BY THE CARRIER UNDER STUDY. FOR EXAMPLE, FOR AT&T LOCAL, THIS WOULD BE TRAFFIC PASSING FROM VZ-T TO AT&T LOCAL, WHERE THE CALLED NUMBER IS NOT OWNED BY AT |
| VZT TO CARRIER DIRECT O | TRAFFIC THAT PASSES FROM VZ-T TO THE CARRIER SWITCH UNDER STUDY, AND THE CALLED NUMBER IS OWNED BY THE CARRIER UNDER STUDY. FOR EXAMPLE, FOR AT&T LOCAL, THIS WOULD BE TRAFFIC PASSING FROM VZ-T TO AT&T LOCAL, WHERE THE CALLED NUMBER IS OWNED BY AT&T LOCAL |
| VZT TO CARRIER INDIRECT O | TRAFFIC THAT PASSES FROM VZ-T TO A 3RD PARTY SWITCH, AND THE CALLED NUMBER IS OWNED BY THE CARRIER UNDER STUDY. FOR EXAMPLE, FOR AT&T LOCAL REPORT, THIS WOULD BE TRAFFIC PASSING FROM VZ-T TO A COMCAST SWITCH, WHERE THE CALLED NUMBER IS OWNED BY AT&T LOCAL |
| 3RD PARTY TO VZT DIRECT T | TRAFFIC THAT PASSES FROM THE CARRIER SWITCH UNDER STUDY DIRECTLY TO A VERIZON SWITCH, BUT THE CALLING NUMBER IS NOT OWNED BY THE CARRIER UNDER STUDY. FOR EXAMPLE, FOR AT&T LOCAL, THIS WOULD BE TRAFFIC PASSING FROM AT&T LOCAL TO VZ-T, WHERE THE CALLING NUMBER IS NOT OWNED BY AT&T LOCAL |
| CARRIER TO VZT DIRECT T | TRAFFIC THAT PASSES FROM THE CARRIER SWITCH UNDER STUDY TO VZ-T, AND THE CALLING NUMBER IS OWNED BY THE CARRIER UNDER STUDY. FOR EXAMPLE, FOR AT&T LOCAL, THIS WOULD BE TRAFFIC PASSING FROM AT&T LOCAL TO VZ-T, WHERE THE CALLING NUMBER IS OWNED BY AT&T LOCAL |
| CARRIER TO VZT INDIRECT T | TRAFFIC THAT PASSES FROM A 3RD PARTY SWITCH TO VZ-T, WHERE THE CALLING NUMBER IS THE CARRIER UNDER STUDY. FOR EXAMPLE, FOR AT&T LOCAL REPORT, THIS COULD BE TRAFFIC PASSING FROM A COMCAST SWITCH TO VZ-T, WHERE THE CALLING NUMBER IS OWNED BY AT&T LOCAL |
| PEG | THE NUMBER OF CALL ATTEMPTS REGISTERED |
| MOU | MINUTES OF USE BASED ON CARRIER CONNECT TIME |
| AHT | AVERAGE HOLD TIME = TOTAL MOU/TOTAL CALLS [PEG COUNT] |

FIG. 7C

| VERIZON TERMINATING (T) DIRECT OBSERVED PVU REPORT 740 | |
|---|---|
| STUDIED CARRIER | CARRIER NAME UNDER STUDY |
| OCN CARRIER NAME | ORIGINATING NUMBER OWNER |
| TOTAL MOU | TOTAL MOU BASED ON CONNECT TIME |
| JURISDICTION | THE BILLING JURISDICTION BASED ON THE RATE CENTER AND OWNERSHIP RELATIONSHIP BETWEEN DIALING AND DIALED NUMBER |
| ORIGINATING SWITCH TYPE: | |
| CKT | MOU ORIGINATING FROM A CIRCUIT SWITCH |
| % CKT | % MOU ORIGINATING FROM A CIRCUIT SWITCH |
| PKT | MOU ORIGINATING FROM A PACKET SWITCH |
| % PKT | % MOU ORIGINATING FROM A PACKET SWITCH |
| CKT + PKT | MOU ORIGINATING FROM A SWITCH WITH BOTH CIRCUIT AND PACKET FUNCTIONALITY |
| % CKT + PKT | % MOU ORIGINATING FROM A SWITCH WITH BOTH CIRCUIT AND PACKET FUNCTIONALITY |
| UNK | MOU WHERE CIRCUIT OR PACKET FUNCTIONALITY OF THE ORIGINATING SWITCH CANNOT BE DETERMINED |
| % UNK | % MOU WHERE CIRCUIT OR PACKET FUNCTIONALITY OF THE ORIGINATING SWITCH CANNOT BE DETERMINED |

| VERIZON ORIGINATING/TERMINATING WIRELESS JUR REPORT 742 | |
|---|---|
| STUDIED CARRIER | CARRIER NAME UNDER STUDY |
| OCN CARRIER NAME | ORIGINATING/TERMINATING NUMBER OWNER |
| TOTAL MOU | TOTAL MOU BASED ON CONNECT TIME |
| JURISDICTION | THE LANDLINE BILLING JURISDICTION BASED ON THE RATE CENTER AND OWNERSHIP RELATIONSHIP BETWEEN DIALING AND DIALED NUMBER |
| WIRELESS JURISDICTION | INTER- OR INTRA-MTA FOR WIRELESS CALLS BASED ON THE RELATIONSHIP BETWEEN DIALING, DIALED AND JIP FIELDS |

FIG. 7D

ENRICHING TRAFFIC DATA IN A TELEPHONE NETWORK

BACKGROUND

Optimizing a telecommunications network may require balancing equipment and trunking against service and cost. Network design may involve predicting future demand based on past results, evaluating the capacity of equipment and facilities, and providing the correct amount of capacity in the proper configuration, in time to meet service objectives. Since virtually every element of a telecommunications system is subject to failure or overload effective testing, monitoring, control, and maintenance is essential to obtain an acceptable level of performance.

Monitoring and analyzing types of traffic going through the telephone network may help identifying jurisdiction and ownership associated with the traffic (also known as jurisdictionalizing the traffic). The term jurisdiction may refer to a billing rate that is applied to a call based on state and federal tariffs. This process may consist of identifying if traffic originated or terminated to a Local Exchange Carrier (LEC) subscriber (e.g., Verizon™). Jurisdiction may then be applied based on the relationship between the rate centers of the Calling Party Number (CPN) and Called Number (CLD). In determining jurisdiction ported numbers may be considered. A ported number is a number that is no longer associated with the service provider that originally assigned the number to the customer. A customer of a telephone number assigned by the service provider has the ability to change service provider while keeping the same number. For example, a user of a telephone number assigned by AT&T™ has the ability to change carrier to Verizon™ while keeping the number originally assigned to the user by AT&T™.

However, using the ported numbers to identify the jurisdiction may not lead to an optimal result for jurisdictionalizing the call. This is because some switches serve more than one service provider or serve more than one rate center (e.g., providing different rates for calls) but use only one Location Routing Number (LRN). An LRN may be a unique number that uses the format of a telephone number, but actually represents an entire telephone switch through which multiple telephone numbers are routed. As such, the use of the ported numbers may introduce error into the jurisdiction process as some ported numbers will be mapped to the LRN's rate center and not their own rate center.

If originating or terminating to a Verizon subscriber, the call was labeled non-transit and the owner of the traffic was the owner of the switch being studied. Such determination of call ownership does not take into account call forwarding and ported numbers, for example and as such may introduce error in assigning ownership to the call. Hence, a need exists for a more accurate determination of the ownership and jurisdiction associated with the traffic going through the telephone network.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2A is a diagrammatic illustration of the actual switched telephone network and elements of the traffic tracking system used to capture call data from that network. FIG. 2B depicts the data processing elements/software of the traffic tracking system;

FIGS. 7A-7D show various fields, which may be used to generate different reports from the enriched calls of the super CDR;

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high level, without detail, in order to avoid unnecessarily obscuring aspects of the present teachings.

As noted above, the existing traffic trend analysis systems and methods may limit the capability to determine call ownership and jurisdiction. The instant application describes a more accurate representation of ownership and jurisdiction than merely using existing CPN to CLD (or ported CLD). Two methods are described: one to assign call ownership and another to assign jurisdiction. An Originating Number (ONUM) and a Terminating Number (TNUM) may be used to identify the number owning carrier of the originating and terminating numbers. A Dialing (DG) number and a Dialed (DD) number may be used to properly jurisdictionalize the call. The ported numbers may not be considered when selecting DD and DG numbers.

In order to identify ownership and jurisdiction, the traffic track system of the instant application may perform several types of enrichment on Call Detail Records (CDRs). The traffic track system obtains the CDRs by filtering on originating and terminating point codes passed over SS7 data links. The process of obtaining CDRs from the point codes and performing various processing on them is described in the U.S. Pat. No. 6,744,866 ("Nolting"), content of which is incorporated herein in its entirety.

Figure 1:
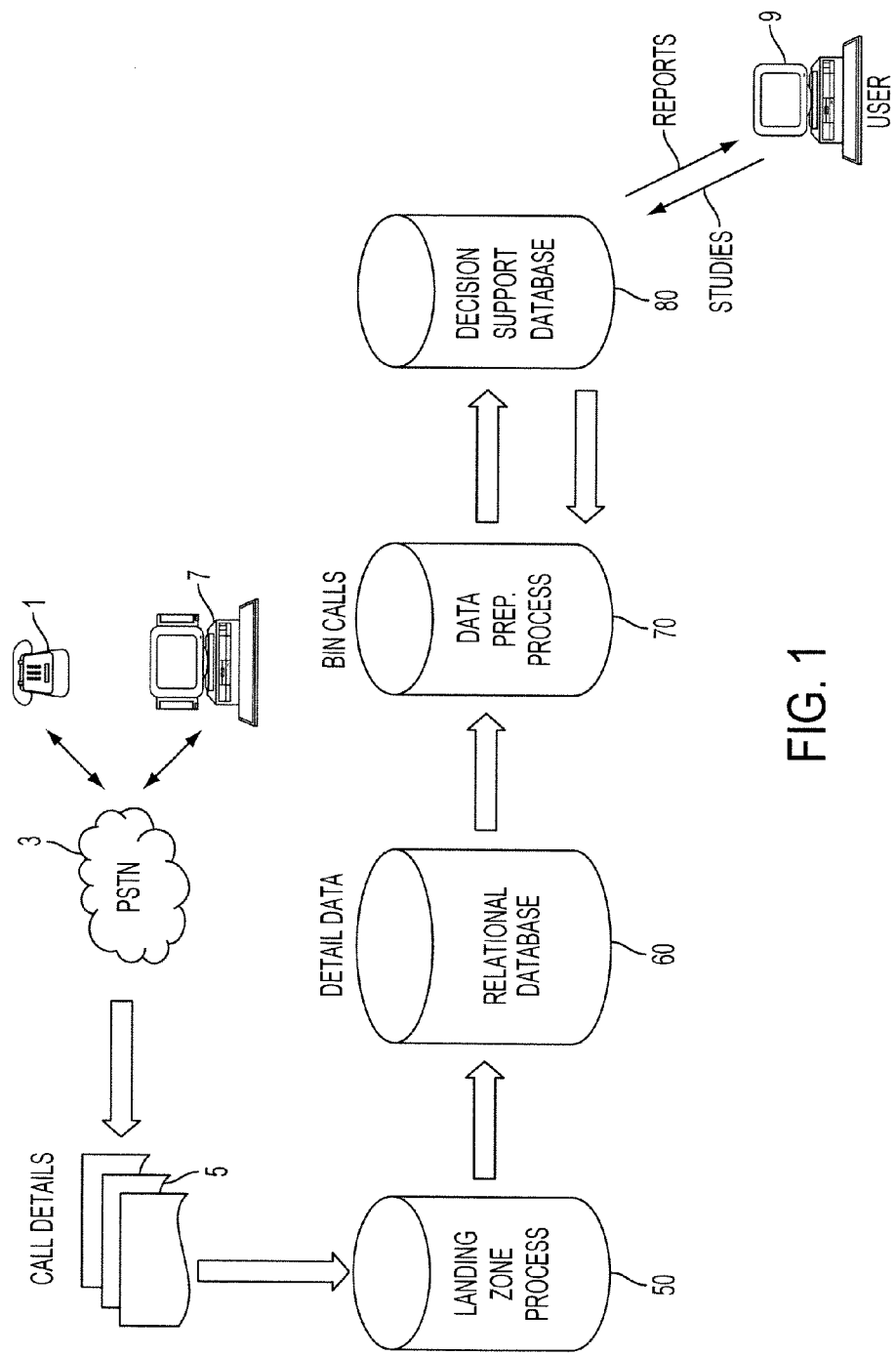
FIG. 1 is a block diagram showing the high-level functional aspects of the traffic tracking system.

FIG. 1 provides a high-level illustration of the functions involved. Typically, customers using telephones such as the telephone 1 make calls through the public switching telephone network (PSTN) 3. The PSTN provides switched connections between calling and called stations. The network billing equipment and/or certain monitoring equipment in the PSTN 3 accumulates records 5 of the details of the calls. The call detail 5 for each call includes a wide variety of different items of information about the call, including for example calling and called party numbers, the time of the call, the duration of the call if completed, the type of release if terminated without completion, identification of office(s) serving the call, etc. The PSTN 3 accumulates similar call detail records 5 for calls to and from data devices, such as calls from the personal computer (PC) 7 to ISPs.

The call details 5 are supplied through a database input procedure 50, referred to as a "landing zone." The Agilent Digitized Measurement Circuitries (DMC) loads the call details into appropriate tables in one or more relational databases 60. The relational database stores call details derived from monitoring of interoffice signaling messages. The relational database 60 stores the bulk detail data in an accessible form. However, still further processing is needed to allow analysis and output of the results in desired aggregate forms. Data from the relational database 60 is prepared and uploaded in data preparation process 70 for input for a decision support database 80.

The data preparation process 70 summarizes details of calls and categorizes calls into logical groupings. The data preparation process 70 may involve modifying the call details by application of reference data to the data. The reference data may include LRN data, Voice over IP (VoIP) data, Local Exchange & Routing Guide (LERG) data, and local call jurisdiction data. For example, the data preparation process 70 may add ported information to the call detail information obtained from the CDRs. Also, the data preparation process 70 may also add a label on the originating and terminating side of a call if the call obtained from the CDRs is in the VoIP number list. The processed call detail information is then uploaded to the decision support database 80.

The decision support database 80 analyzes the prepared call details and compiles data into reports, for output to a user's terminal 9. The decision support database 80 receives inputs and presents outputs via the user terminal 9, to set up reports. The decision support database 80 captures and stores high level summary data and displays it through the user terminal 9 in a variety of ways. The data may include CDRs enriched with LRN, VoIP, LERG and local information.

The traffic tracking system of the instant application therefore provides effective monitoring of various systems of a public telephone network and processing of the data derived from such monitoring, to enable analysis of various patterns of the traffic through the telephone network. The monitoring involves capture of interoffice signaling messages relating to inter-office telephone calls through the network. It may be helpful at this point to review the structure and operation of the telephone network, at a relatively high level.

Figure 2A:
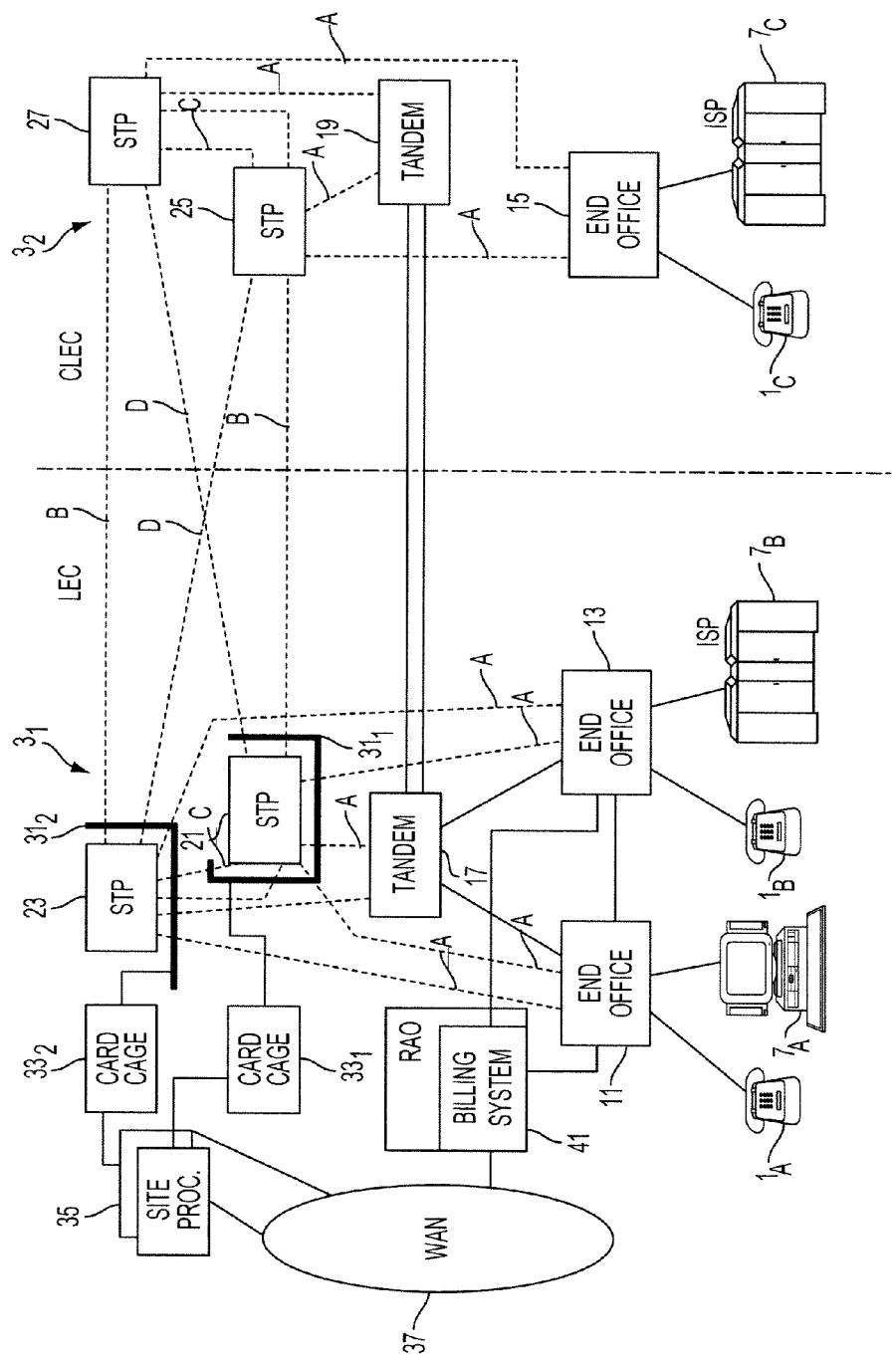
FIGS. 2A and 2B, together, provide a block diagram overview of a public switching telephone network with a traffic tracking system. Of these two drawings.

Referring to FIG. 2A there is shown a block diagram of a public switching telephone network and the SS7 (signaling system seven) network that carries the call control signaling for the switched network. The telephone network may include many segments operated by different carriers, including LECs and interexchange carriers (IXCs). For purposes of this discussion, FIG. 2A illustrates two such segments or sub-networks. One sub-network is a network $3_1$, operated by a LEC. The other sub-network could be that of an IXC or any other carrier, but for purposes of this discussion, FIG. 2A depicts a second network or segment $3_2$ operated by a Competitive Local Exchange Carrier (CLEC).

The switched portion of telephone network may include a series of central office (CO) switches, which are conventionally referred to as signaling points (SPs) in reference to the SS7 network. Certain of these SPs comprise end offices (EOs) illustrated at 11, 13 and 15 in the drawing. Each signaling point has a point code comprising a 9-digit code assigned to every switching node in the SS7 network. As discussed more later, messages communicated via the SS7 signaling network utilize the codes to identify source and destination SPs, and the traffic tracking system can use these point codes to identify messages relating to traffic through particular offices. The traffic track system collects CDRs by filtering or originating and terminating point codes as messages are passed over SS7 data links.

The end offices 11 and 12 represent end offices in the region of one operating company or LEC, whereas the end office 15 represents one of the end offices in the region of a different operating company, in this case a CLEC. Each operating company may have its own network ID, which is used as the first three digits of the point codes of the SPs of that carrier's network. Also, each end office may reside within an area assigned NPA digits as an area code. Each exchange is identified by one or more three-digit codes referred to as NXX digits. Each such code corresponds to the NXX digits of an NXX-XXXX (seven-digit) telephone number or the three digits following the three area code digits (NPA) in a ten-digit telephone number. As a result, the NPA-NXX digits of telephone numbers also can serve as identifiers of end offices. Origination and destination telephone numbers appear in various SS7 signaling messages and various records that the offices create for billing and the like.

Digital trunk circuits, shown as solid lines, interconnect the switching offices of each network 3. Typically, within one carrier's network $3_1$, end offices, such as end offices 11 and 13, are directly interconnected by trunk circuits. For overflow traffic and/or for connections to other carrier networks, the offices 11 and 13 also connect via trunk circuits to a tandem office 17. In the CLEC network 32, the end office 15 connects through a trunk circuit to a tandem 19 or direct to an end office. The LEC and CLEC networks $3_1$, $3_2$ interconnect through trunk circuits shown for example between the tandems 17 and 19, although end office interconnections are possible.

The SS7 type interoffice signaling network comprises a series of Signal Transfer Points (STPs) shown here at 21, 23, 25 and 27 and interconnecting data links indicated by dotted lines. Each STP in a network connects to the SP capable offices in that network via A links. Thus, in the LEC network $3_1$, the end offices 11, 13 and the tandem 17 connect to the STPs 21, 23 through A links. Similarly, the End office 15 and the tandem 19, in the CLEC network $3_2$, connect to the STPs 25, 27 via A links.

Within the LEC network $3_1$, the STPs 21 and 23 constitute a mated pair of STPs connected to each other via C links. Within the CLEC network 32, the STPs 25 and 27 also constitute a mated pair connected by C links 58. Each of these mated pairs serves its respective transport area and/or carrier network. The STP 21 connects to the STP 25 via a B link, and the STP 21 connects and to the STP 27 via a D link. Similarly, the STP 23 connects to the STP 27 through a B link, and the STP 23 connects and to the STP 25 through another D link.

The A, B, C and D links are physically identical links. The letter designations for these various links relate to cost in terms of ease of access. The A links represent the lowest cost. The B and D links have the same route cost with respect to SS7, so that the D designation is used only because it extends diagonally in the drawing. The C links are used to communicate between the two mated STPs of a pair, for network management information and also constitute another message route. The STP pair cannot function without the C links. Unnecessary utilization of the C links causes congestion and prevents the paired STPs from performing their intended function.

The STPs in any mated pair have the same translations. Thus, the translations in STP 21 are the same as the translations in STP 23, and the translations in STP 25 are the same as the translations in STP 27. The translations control the message routing through the STP. The STPs may connect to transactional database systems, such as Service Control Points (SCPs), Integrated Service Control Points (ISCPs) or the like. Such database systems, for example, provide call control information for a wide range of recently developed enhanced features. Other database systems, such as the Line Identification Database (LIDB) provide information for ancillary purposes, for example, for credit card validation, for enhanced versions of Caller ID, etc. The monitoring captures messages going to and from the tandems or end offices. This includes messages exchanged between the offices and the database systems. Although possible, for our purposes, it is not necessary at this time to separately monitor the links to the database systems. Therefore, for simplicity of illustration, these databases have been omitted from FIG. 2A.

The traffic tracking system may rely on capture and processing of the common channel interoffice signaling (CCIS) messages exchanged between offices, during otherwise normal call processing. It may be helpful at this point to consider the preferred protocol for such messages, SS7, in some detail. A detailed explanation of the SS7 protocol may be found in Bell Communications Research, "Specification of Signaling System Number 7," Generic Requirements, GR-246-CORE, Issue 1, December 1994, the disclosure of which is incorporated herein in its entirety by reference. A summary description of the most relevant aspects of SS7 appears below.

For SS7, typical applications layer protocols include Transaction Capability Application Part (TCAP); Operations, Maintenance, Application Part (OMAP); and ISDN User Part (ISDN-UP). TCAP provides the signaling protocols for exchange of non-circuit related, transaction-based information, typically for accessing databases such as SCPs. OMAP specifies protocols for certain specialized messages relating to maintenance and operations. Although the tracking system can capture and analyze TCAP and OMAP messages, for purposes of the presently preferred embodiments, the most relevant part is the ISDN-UP, sometimes referred to as "ISUP". ISDN-UP specifies the procedures and message protocols for setting up and tearing down trunk connections for calls utilizing common channel interoffice signaling (CCIS). ISDN-UP messages, for example, include an Initial Address Message (JAM), an Address Complete Message (ACM) and an Answer Message (ANM).

SS7 specifies an Application Service Part (ASP) for performing presentation, session and transport layer functions for the TCAP and OMAP protocols. The lower three layers of the SS7 protocol, the network layer, the signaling link layer and the data link layer, form the Message Transfer Part (MTP) of SS7. The MTP is common to messages for all applications and provides reliable transfer of signaling messages between network nodes. The MTP relays messages between applications running at different nodes of the network, effectively like a datagram type service.

Figures 3, 4:
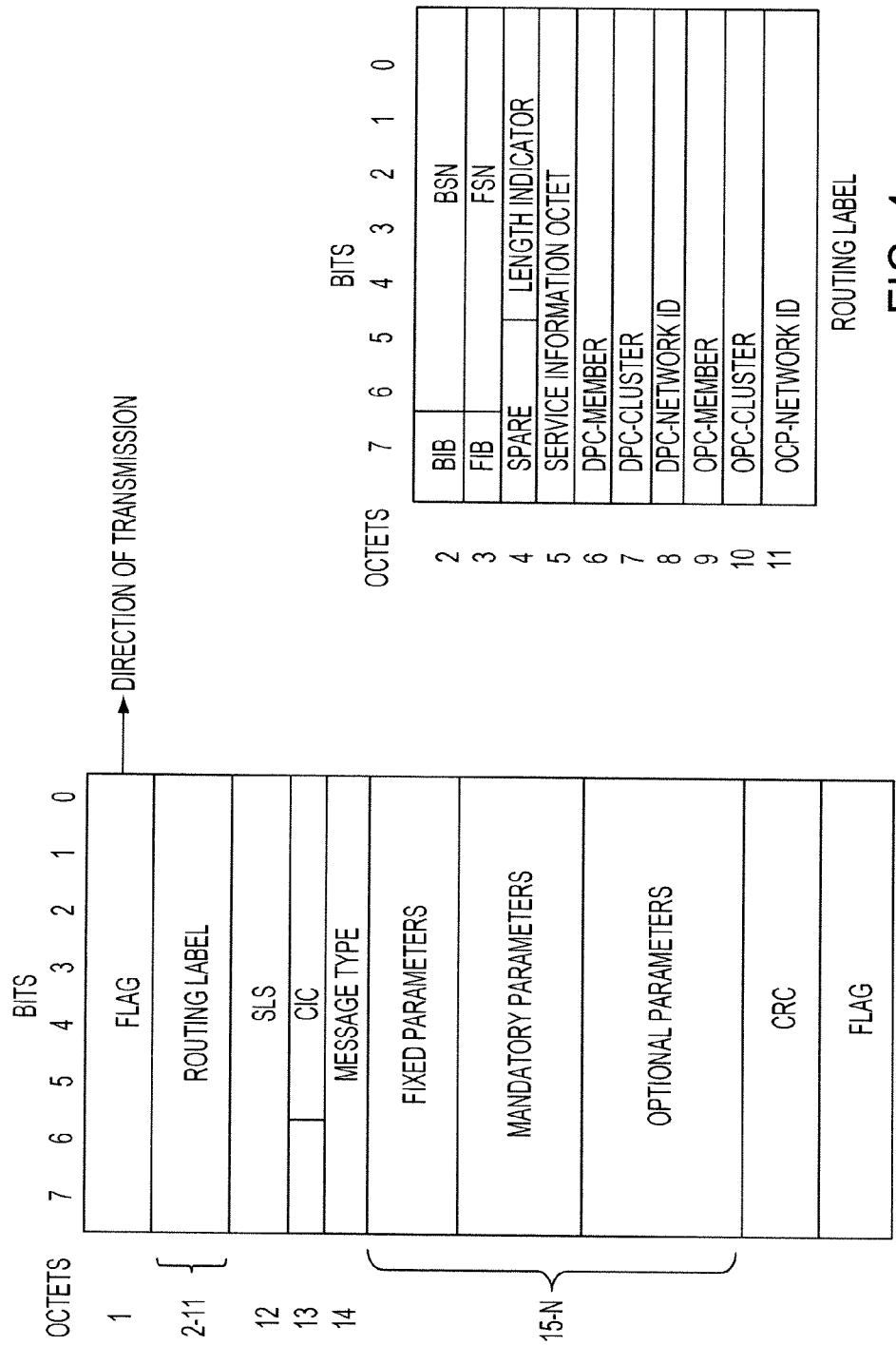
FIG. 3 illustrates in graphic form the layout of an SS7 message.
FIG. 4 graphically depicts the layout of the routing label portion of the SS7 message of FIG. 3.

The SS7 messages traverse the network at all times. The messages themselves comprise digital serial messages that come to the STP for routing. FIG. 3 provides a graphic illustration of an SS7 message packet. The first byte or octet of the message is a flag, which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bit bytes or octets. These octets represent the information carried by the message. The message contains both fixed and variable parameters. The Message Transport Part (MTP) of the SS7 message is always in the same place. The values change but the MTP is always in the same place.

Octets 2-11 form a routing label as discussed later with regard to FIG. 4. Octet 12 contains a signaling link selection (SLS) byte used to select specific links and/or determine the extent to which the network can select specific links to achieve load sharing. Octet 13 contains a Customer Identification Code (CIC) which typically is used to select an interexchange carrier. Octet 14 contains a message type indicator, and octets 15-N contain the actual message, in the form of fixed parameters, mandatory parameters and optional parameters. The length of the mandatory parameters field and the optional parameters field are variable. After the parameter fields, there are 16 other bits for Cyclic Redundancy Codes (CRCs) followed by another flag, which constitutes the end of the SS7 message (and typically the start of the next message). The CRCs constitute an error detection code.

Several of the traffic tracking reports may rely on translation and/or analysis of certain addressing information from the SS7 messages. The addressing information used for the MTP and for the traffic analysis appears in the routing label. FIG. 4 is a graphic illustration of the routing label of the SS7 message packet. The first 7 bits of octet 2 constitute the Backward Sequence Number (BSN). The eighth bit is the Backward Indicator Bit (BIB) which is used to track whether messages have been received correctly. The length of an SS7 message is variable, therefore octet 4 contains a message length indicator.

Octet 5 is the Service Information Octet (SIO). This indicates whether it is a Fill In Signal Unit (FISU), Link Service Signaling Unit (LSSU) or Message Signaling Unit (MSU). MSUs are the only ones used for setting up calls, LSSUs are used for alignment, and FISUs are fill-in signals. The MSU indicator type SIO octet is formatted and encoded to serve as an address indicator, as discussed below.

The routing label includes fields for both destination related addressing and point of origin addressing. The destination or 'called party' address for the SS7 packet message itself includes octets 6, 7 and 8. Octets 9-11 carry origination point code information, for example member, cluster and network ID information, for the node on the SS7 network sending the message.

In the example shown in FIG. 4, the three octets of the called party address contain an actual destination point code (DPC) identified as DPC-member, DPC-cluster and DPC-network ID information. In operation, the translation tables stored in an STP cause the STP to actually route based on the DPC without translating any of the DPC octets into new values. The called party address octets (6-8), however, may carry other types of called party addressing information and receive different treatment by the STP. For example, these octets may carry a global title (GTT) and subsystem number (SSN) information.

To distinguish the types of information carried in octets 6-8, the MSU type service information octet (5) contains an address indicator. For example, a '1' value in the first bit position in this octet signifies that the called party address octets contain a subsystem number, a '1' value in the second bit position in this octet signifies that the called party address octets contain a signaling point code. The third, fourth, fifth and sixth bits of the address indicator serve as the global title indicator and are encoded to identify the presence and type of global title value in octets 6-8.

The MTP processing of the STP routes SS7 packets based on point codes. When an STP receives a packet, the STP examines the address indicator octet (5). If the indicator shows that the called party address octets (6-8) contain DPC bytes only, then there is no translation of the DPC bytes, and the MTP processing by the STP will route the packet based on the DPC value. If the address indicator (octet 5) shows that the called part address octets (6-8) includes global title information, then the signaling connection control part (SCCP) protocol layer processing in the STP translates the global title (GTT) into a destination point code (DPC) and inserts the destination point code into the SS7 packet. The subsequent MTP processing will route the packet using the translated DPC value.

The SS7 network constitutes a highly redundant data network, generally using 56K switched data circuits for the various links to and between the STPs. Because of the redundancy, different signaling messages for a given call may actually transit different routes through the SS7 network.

The operation of placing a call from telephone 1A to telephone 1B may be summarized with reference back to FIG. 2A. The user at station 1A picks up his handset and dials the number of station 1B, which normally resides in the end office 13. The SP end office 11 generates an Initial Address Message (IAM) with a destination point code for the end office 13 and an originating point code of the end office 11. The IAM includes a variety of information needed for call set-up. The end office 11 sends the IAM to either STP 21 or STP 23. That STP examines the address information and its translations and routes the message over the next appropriate link, in this case over the A link to the end office 13.

In response to the IAM message, the end office 13 determines whether or not the line corresponding to that number is busy. If the line is available (not busy), the end office 13 generates an Address Complete Message (ACM) to indicate that it received the request for a call and that the called line is available. The end office 13 sends the ACM message back by simply reversing the origination and destination point codes and sending the message over an A link to one of the STPs 21, 23. The ACM may or may not go over the A link that carried the IAM to the end office 13, and it may go to the other STP of the pair. However, again, the STP receiving the message examines the addresses and uses its translations to forward the message over another link to the appropriate destination, in this case the end office 11.

The end office 11 sends a ring back tone over the line to the calling station 1A. At about this time, the end office 1B applies a ringing signal to the line to the called station 1B. The calling party hears the ring back tone and awaits an answer. The station 1B rings to alert persons at the destination to the presence of an incoming call.

If someone or an answering machine answers the call at the station 1B, there will be an off-hook condition on the line; and the end office 13 will recognize this as a ring-trip condition. The end office 13 interrupts the ringing signal on that line. The end office 13 also sends an Answer Message (ANS) back through the SS7 network to the end office 11, indicating that the called telephone station 1B was picked up.

At that time the necessary trunk circuits between the end offices are connected together and assigned to the call. The trunk connection may run through the tandem 17, but in this example, the trunk connection extends directly between the end offices. The end office 11 connects the line for station 1A to the trunk circuit, and the end office 13 connects the line for station 1B to the trunk circuit. At this point a complete voice-grade telephone connection exists between the two stations, and the parties can speak and receive verbal information.

The SS7 monitoring system may be implemented on any carrier's portion of the PSTN. In the illustrated example, the LEC network $3_1$ has the monitoring and call detail compilation equipment, for the traffic tracking. The LEC portion of the public switching telephone network (PSTN) is provided with a traffic monitoring and analyzing system comprising monitors 31, card cages 33 and one or more site processors or servers 35, of the type described in detail in a U.S. Pat. No. 5,475,732 ("Pester"), the content of which is incorporated herein in its entirety. One commercial implementation of such an SS7 monitoring system is currently available from Hewlett Packard, under the product name "AcceSS7".

FIG. 2A shows the sets of monitors or interfaces $31_1$, $31_2$ to the SS7 links to the STPs 21, 23 in diagrammatic form, as solid bold line across respective links. A card cage $33_1$ connects the monitors $31_1$ to a site processor 35. Similarly, a card cage $33_2$ connects the monitors 31? to the same or another site processor 35. The monitors 31 may be conductively or non-conductively coupled to the links to serve as passive interfaces. The card cages 33 connect the monitors 31 to a site processor 35 for accumulation, storage and processing of the raw SS7 messages.

It is intended that multiple monitoring systems of this type serving different purposes may advantageously exist in the PSTN, for example for operations monitoring and/or fraud detection, in addition to the system illustrated from traffic tracking and analysis. For simplicity and clarity, however, only a single system is here illustrated.

The SS7 A link signaling in a completed call typically includes an Initial Address Message (IAM) an Answer Complete Message (ACM), an Answer Message (ANM), Release Message (REL), a Release Complete Message (RLC), and the various other elements described hereinabove. Since the common channel signaling system is intentionally redundant, the messages in a related set may be routed over different A links. In our example, the IAM may go through STP 21, whereas the ACM and ANM may just happen to go through the STP 23. It is therefore necessary to monitor an appropriate set of links and to reassemble the signaling pertaining to a desired transaction or signaling set such as a single call, to provide one call detail record or CDR. This is accomplished in the site processor 35 in a known manner as described in Pester.

It should be noted that the PSTN conducts signaling on all interoffice calls, and the monitoring system traps messages and compiles CDRs for all interoffice calls. In particular, the system provides CDRs for both calls completed to a destination station and calls that terminate without completion. For example, the system accumulates CDRs for calls that are blocked because the called line is busy, because there are no network resources available to the terminating end office (network busy), etc.

With the reassembled message sets the site processor has the data to show the called and calling stations 1A, 1B, the start time of the call, the elapsed time of the call, the originating office, the terminating office and various other detailed data. By monitoring the SS7 signaling for all of the calls originating in, terminating in or passing through a designated switch, such as the switch 15, it is possible to analyze the traffic to identify particularly significant patterns.

One or more site processors 35 accumulate the CDRs for the traffic monitoring application of the traffic tracking system. Periodically, each site processor 35 transmits the latest set of CDRs over a private wide area network (WAN) 37, operated by the LEC for its internal business purposes. The WAN 37 may carry a variety of LEC network operations data. For purposes of the discussion, the WAN transports the CDRs from the site processor 35 to a computer system or server running a relational database 61 (FIG. 2B) for the accumulated SS7 data.

It will be understood that calls completed through a single switch, such as a call from telephone terminal 1B through end office switch 13 to ISP 7B, will not generate the above discussed SS7 signaling and thus will not be reflected in the CDRs developed from such signaling. For such intra-switch calls, and for otherwise supplementing the call detail information derived from monitoring the interoffice signaling messages, the traffic tracking system utilizes data accumulated by the switches.

As outlined above, the site processors 35 assemble and process information with respect to inter-switch calls but do not handle intra-switch calls. In order that all traffic may be monitored and analyzed, the traffic tracking system utilize Automated Message Accounting (AMA) data.

Various network elements, such as the switches 11, 13 and/or 17 of the LEC network 3, generate AMA records. Such records are used to provide call details to enable the LEC to bill for the completed calls, for example to bill the end users, to bill IXCs, to bill CLECs, etc. The AMA records may also provide call details for other network operations, e.g. for maintenance purposes. In operation, a switch examines a customer's service request, typically the destination telephone number, and based on customer profile or service information determines if there is a need for AMA recording for the call. If so, the switch outputs AMA records for significant events in processing of the call. The AMA records are typically in the Bellcore AMA Format (BAF).

The AMA records from the switches go to one or more billing systems 41, typically in a regional accounting office (RAO). The records may be transported to the RAO by physical transport of data tapes, but preferably, each of the switches has an AMA Transmitter (AMAT) or the like coupled to an appropriate data link to allow electronic communication of the records to the RAO. Although shown separately, these data links may be logical links provided through the WAN 37.

In the RAO, the AMA data records are edited and checked for integrity and supplied to the appropriate billing system 41. For this purpose, a message-processing server (MPS) assembles the various entries relating to a call into a completed message. Any incomplete messages are analyzed for administrative purposes and fraud detection. The complete messages are loaded into the billing system 41.

For example, a billing system, which some carriers refer to as the Customer Record information System (CRIS), processes records for end user billing. The CRIS system calculates the monetary amount for each usage event, identifies the appropriate customer's billing account and posts the billable amount to that account. Another common example of a billing system is the Carrier Access Billing System (CABS) which LECs use to process AMA records to calculate and post tariffed charges for other carriers such a cellular companies, IXCs and CLECs.

The billing system 41 may spin-off the AMA data for completed calls, for ancillary purposes. The billing system transmits certain completed AMA message data to a server, which maintains an AMA relational database 63. The billing system 41 could transmit the AMA records for all calls through the network, but that would produce a massive amount of data, much of which is unnecessary for studies that are active at any given time. Therefore, the billing system 41 may be programmed to forward AMA records only for calls that are pertinent to some on-going traffic track study, for example all calls terminating in an identified end office during a specified study period.

The AMA system typically records call details only for billable calls, e.g. for toll calls but not for flat-rate local calls. However, for purposes of the traffic track studies, translations are established in the switches to accumulate and forward the AMA data for all calls of interest, e.g. for all calls passing through the LEC network $3_1$ coming from or going to the CLEC network $3_2$. The added AMA translations are stored in all of the offices 11, 13, 17 but can be turned-on or off, as appropriate for particular studies.

The AMA equipment records call details at each stage of a connection. The calling and called party numbers are registered initially. An answer entry registers the time of connection, and the terminating entry registers the time of disconnect. A common identifier in each entry serves to link the entries relating to a particular call, to distinguish them from those of other calls. The processing of the AMA data in the RAO and billing system 41 assembles the entries for completed calls into complete messages directly analogous to the CDRs produced through SS7 monitoring. Any incomplete messages are analyzed for administrative purposes and fraud detection. For tracking purposes, the billing system 41 delivers the processed AMA call data to the WAN 37. The WAN 37 in turn delivers the data to a central server running the AMA relational database system application 63.

Both the AMA components and the SS7 monitoring components accumulate call detail records. The AMA records relate to each completed call originating or terminating through a switch 11, 13, or 17 having active AMA reporting software. The SS7 records relate to each call (completed or not) through the LEC network $3_1$, which involves interoffice signaling for call set-up. These records for each call take different forms, depending on the equipment accumulating the data, and the two different types of records are uploaded into two different databases 61, 63. Both types of call detail records are essentially flat files, containing detailed information about each call.

In actual operation, the processing of loading the flat files for the call detail records into the respective databases 61, 63 involves some initial record collection and management processing, referred to as a landing zone or "LZ" process 50. The LZ 50 manages the incoming CDR data streams, checking for errors and loading the data into the relational database tables. The LZ 50 buffers incoming records and periodically uploads the records into the tables. The records follow a first in, first out (FIFO) logic at the landing zone.

Because the two types of call detail records are somewhat different, the landing zone 50 actually comprises two different LZ routines 51, 53. The landing zone process LZ 51 is specially adapted to buffering and loading the SS7 CDRs from the site processors 35 into the tables defined in the SS7 relational database 61. The landing zone process LZ 53 is similar, but differs in that it buffers and loads the AMA records from the billing system 41 into the appropriately designed tables in the AMA relational database 63. An example of appropriate database software is available from Oracle.

A two-dimensional database record is just a flat file. A two-dimensional database has individual tables, created for a given collection. The SS7 relational database 61, for example, stores CDRs for millions of calls relating to a particular traffic report. In a report for traffic to and from the Cl. C, the table would contain CDRs compiled from the SS7 messages on the B and D links between the STP pairs. The landing zone process 51 for the SS7 records takes all of those CDRs and loads them into one or more tables set up for the exemplary report. Such a table includes every CDR and every dimension or piece of information within the individual CDRs in a linear form. As a result of the landing zone processing 51, there is a table, within the table there is CDR 1, CDR 2, etc., and within each CDR there are X dimensions for the X different items of information within each CDR.

The example given above involves loading SS7 CDRs into the relational database 61. It should be noted, however, that an essentially similar landing zone process 53 occurs for loading AMA records into the tables in the AMA relational database 61. The tables consist of flat files for the complete AMA records of each call. The amount of information is somewhat different than those for the SS7 CDRs. Each AMA record for a call includes similar information, including the calling number, the called number, the duration of the call, the time of the call and some class of service information. However, an AMA record does not include the originating point code or the destination point code.

The relational databases 61, 63 may be connected to a processor or server running a decision support database 80 program. The decision support database 80 program may be designed for fast access to summarized data. The decision support database 80 may be a Vertica database that is a relational column store DBMS. Reports are created using SQL either in the form of queries exported to a tool that analyzes data or via Crystal reports.

The relational databases 61, 63 store raw call record data. For example, the database 61 contains the raw CDR data, as it compiled by the SS7 network monitoring equipment and supplied by the site processor 35. From the relational databases, the AMA and SS7 CDR data goes through processing referred to as data preparation process 71. The data preparation step enriches the data.

Logically, the data preparation software 71 may run as a separate (e.g. Oracle) relational database. The decision support database may be platform independent and may reside in the same server as the relational database or in a separate server. The data preparation software accesses records from each relational database and uploads the prepared data to the decision support database. The decision support database processes data from those records to generate analytical tables, reports and graphs.

The traffic track system of the instant application is configured to create fully enriched CDRs (e.g., super CDRs) to support all application analyses. The fully enriched CDRs include data from a Local Exchange & Routing Guide (LERG) database. Data is fed to the LERG database from each registered carrier. LERG1 database includes information about Administrative Operating Carrier Name (AOCN), Operating Carrier Name (OCN), AOCN & OCN Category (Carrier Type). LERG6 database includes information about Telephone number Assigned State, LATA, Rate Center, CLLI, AOCN, OCN, etc. LERG7 & LERG7SHA databases include CLLI Code & Switch Type information, used to determine whether a non-Verizon carrier switch is, or is not, Vo EP Capable. LERG8 database include information about Metropolitan Trading Areas (MTA), used to determine Wireless Call Jurisdiction.

The fully enriched CDRs also include data from a Local Number Portability (LNP) database. The LNP database identifies CDR numbers as being ported or not. If ported, the Location Routing Number (LRN) associated with the ported number is added to the CDR. The LNP database may also be modified to include LERG6-1-8 data for enriching the calls with LERG information at the same time as enriching the calls with LNP information.

The fully enriched CDRs also include data from a VoIP Number Identification database. This enrichment may be for Verizon numbers only and may be performed after identifying Originating Numbers (ONUMs) and Terminating Numbers (TNUMs) as will be described further below. The VoIP data identify CDR originating & terminating numbers as being VoIP (Voice Over IP—Internet Protocol) or TDM (Time Division Multiplexing). If VoIP, the data may further identify whether the VoIP number is a FDV (FIOS Digital Voice) or a SIP (Session Initiation Protocol) VoIP number.

The fully enriched CDRs also include call jurisdiction data. The local jurisdiction reference data is supplied by an external vendor and contains NPA-NXX pairs for local call jurisdictions. This enrichment may be performed after identifying Dialing (DG) and Dialed (DD) numbers as will be described further below.

The fully enriched CDRs may be used to determine call ownership and jurisdiction. In determining call ownership, from the fully enriched CDR, the best originating and terminating numbers may be selected to identify the originating and terminating carriers—ONUM and TNUM. The ONUM and TNUM selection process of the traffic track system of the instant application considers forwarding, ported numbers and the JIP, whereas, the older traffic track process did not take these numbers into consideration. Forwarding number consideration captures call re-origination data and ported number consideration takes into account when numbers have been physically moved out of the switch and or carrier network where they were originally assigned. Jurisdictional Information Parameter (JIP) is chosen when all of the other originating telephone numbers are null or invalid. The JIP is not an SS7 required field so it is often sparsely populated. Thus, JIP is the last option in the ONUM selection process of the traffic track system of the instant application.

In one implementation, the ONUM may be selected in accordance to the following logic rules: (1) the ONUM is the forwarding international number, (2) if no forwarding international number, the ONUM is the forwarding ported number, (3) if no forwarding international number and no forwarding ported number, the ONUM is the forwarding number, (4) if no forwarding international number, no forwarding ported number, and no forwarding number, the ONUM is the calling party international number, (5) if no forwarding international number, no forwarding ported number, no forwarding number, and no calling party international number, the ONUM is the calling party ported number, (6) if no forwarding international number, no forwarding ported number, and no forwarding number, no calling party international number, and no calling party ported number, the ONUM is the calling party number, (7) if no forwarding international number, no forwarding ported number, no forwarding number, no calling party international number, no calling party ported number, and no calling party number, the ONUM is the charge international number, (8) if no forwarding international number, no forwarding ported number, no forwarding number, no calling party international number, no calling party ported number, no calling party number, and no charge international number, the ONUM is the charge ported number, (9) if no forwarding international number, no forwarding ported number, no forwarding number, no calling party international number, no calling party ported number, no calling party number, no charge international number, and no charge ported number, the ONUM is the charge number, and (10) if none of the previous numbers is valid, the ONUM is the JIP.

In one implementation, the TNUM is selected in accordance with the following logic rules: (1) if the call has been LNP dipped and found to be ported, the TNUM is a number appearing in a Called Number filed associated with the call, the number being the LRN associated with the call, (2) if the call has been LNP dipped and found to be not ported, the TNUM is a Called Number if the Called Number is a 10 digit number, (3) if the call has been LNP dipped and found to be not ported, the TNUM is the Enriched Called Number if the Called Number is a 7 digit number, the Enriched Called Number may include NPA information, (4) if the call has not been LNP dipped by the network, the Called Number is looked up in the LNP reference data and if found to be ported, the LRN is used for the TNUM, (5) if the call has not been LNP dipped by the network, the called number is looked up in the LNP reference data and if found not to be ported, the Called Number is used for the TNUM if the Called Number is a 10 digit number, and (6) if the call has not been LNP dipped by the network, the Called Number is looked up in the LNP reference data and if found not to be ported, the Enriched Called Number is used for the TNUM if the Called Number is a 7 digit number.

In jurisdictionalizing the call, from the fully enriched CDR, the best Dialing (DG) and Dialed (DD) numbers are selected to enable the most accurate call jurisdiction calculation. The DD and DG selection does not consider ported numbers. The jurisdiction selection process of the instant application considers forwarding numbers and JIP; whereas, the previous traffic track system considered calling party number and charge number. In the jurisdiction selection process, of the instant application, ported numbers are excluded because many switches serve multiple rate centers but have only one LRN. For example, Switch X serves two rate centers: A and B. Switch X's LRN can only be associated with one of the two rate centers (e.g., rate center A). If a number is served by Switch X and ported into rate center B, it will have the same LRN as a number served by Switch X ported into rate center A. If ported numbers were used in the selection process for the DG number then in the Switch X situation described, both of the ported numbers will have the same LRN and will thus both be identified as being in rate center A. However, one of these numbers is in rate center B. Therefore, the use of ported numbers has the potential to introduce error into the jurisdiction calculations. Since porting is restricted to within a rate center, ignoring the ported numbers and using the DG and DD numbers can eliminate or reduce this potential error.

In one implementation, the DG number is selected in accordance with the following logic rules: (1) the DG number is the forwarding international number, (2) if no forwarding international number, the DG number is the forwarding number, 3) if no forwarding international number and no forwarding number, the DG number is the calling party international number, 4) if no forwarding international number, no forwarding number, and no calling party international number, the DG number is the calling party number, 5) if no forwarding international number, no forwarding number, no calling party international number, and no calling party number, the DG number is the charge international number, 6) if no forwarding international number, no forwarding number, no calling party international number, no calling party number, and no charge international number, the DG number is the charge number, and 7) if none of the previous number is valid, the DG number is the JIP.

In one implementation, the DD number is selected in accordance with the following logic rules: (1) if the call is LNP dipped and not ported, the DD number is the enriched called number, (2) if the call is LNP dipped and ported: the DD number is the Generic Address Parameter (GAP), and (3) if the call is not LNP dipped and if the called number is 10 digits, the DD number is the called number and if the called number is 7 digits the DD number is the enriched called number.

More accurate call ownership analysis enabled by the traffic track system of the instant application supports improved Transit Call Analysis (e.g., where LEC (Verizon™) does not originate or terminate the call, but only passes the call from one $3^{rd}$ party carrier network to another). This is also tied into call jurisdiction. Transit calls are gleaned from the Local, InterState-InterLATA, InterState-IntraLATA, IntraState-InterLATA, IntraState-IntraLATA jurisdiction buckets. Additionally, more accurate call ownership analysis enabled by the traffic track system of the instant application allows for generation of OCN reports which rely on the ability to break up traffic flows form interconnecting carriers into Direct and Indirect volumes. Carrier Z direct calls are those calls which come from a Carrier Z switch and have a Carrier Z ONUM, where as Carrier Z indirect calls are those calls which come form a Carrier A switch and have a Carrier Z ONUM. Direct and Indirect traffic analysis is preformed for calls flowing both to and from the LEC, i.e. Verizon™.

The traffic track system of the instant application is configured to enhance the reporting capabilities. In addition to the traffic volume reports based on specific carrier switches and traditional call jurisdictions, the traffic track system of the instant application is configured to generate traffic reports focusing on specific carrier traffic, traffic reports focusing on specific call types, and stand alone wireless jurisdiction reports and wireless jurisdiction reports integrated with traditional jurisdiction reports.

Figure 5:
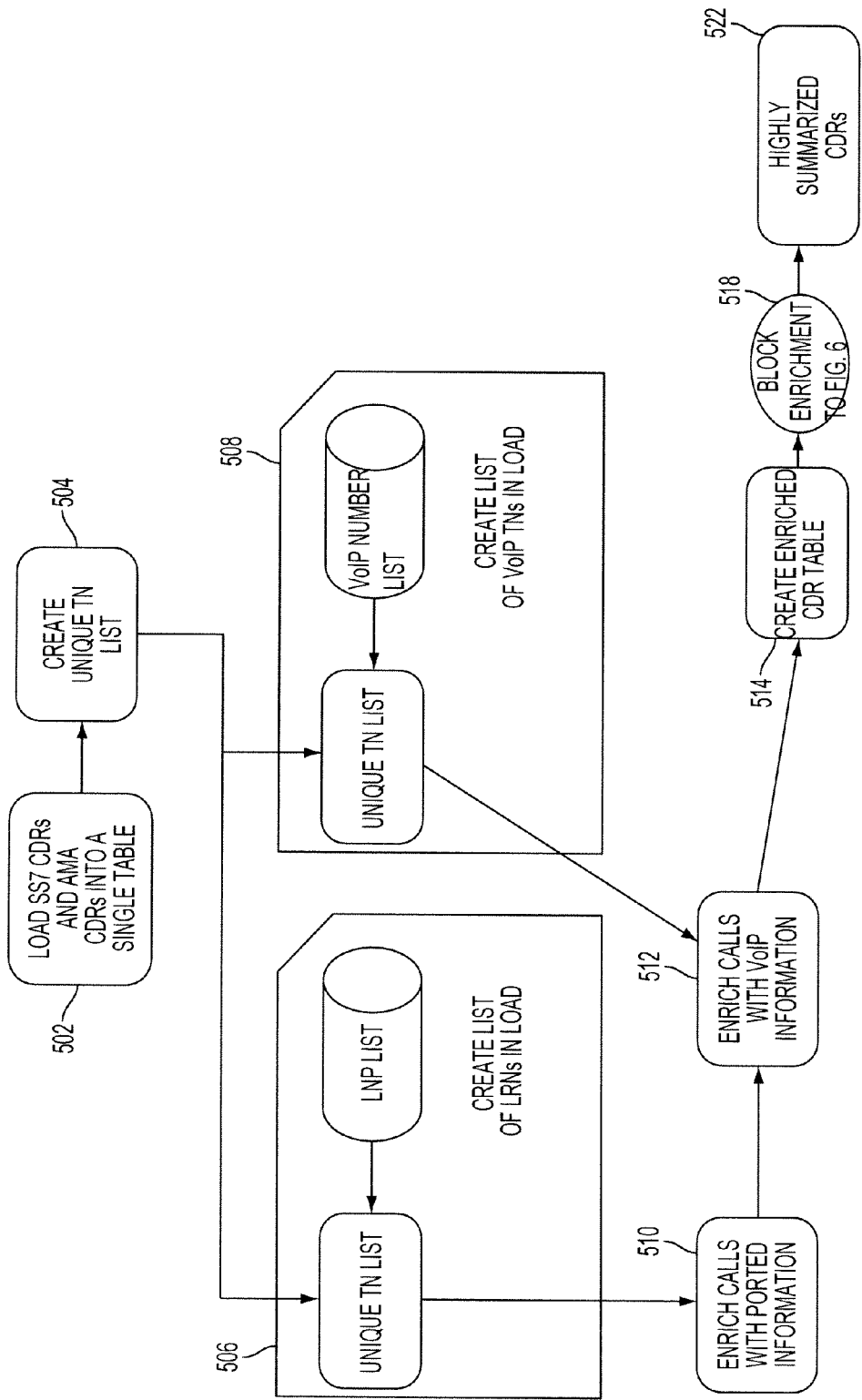
FIG. 5 illustrates a data preparation operation using reference data for enriching original call records from the relational database with the ported information and VoIP information.

FIG. 5 illustrates a data preparation operation using reference data 73 for enriching original call records from the relational database 60 (e.g., the SS7 CDRs), with the ported information and VoIP information. The data preparation process 71 assigns each SS7 CDR to one or more tables. For example, the data preparation process 71 imports the SS7 CDRs from the database 61 into a table (Step 502). The CDRs may include Forwarding Number (FWD), the Calling Party Number (CPN), Charge Number (CHG), Called Number (CLD), and Generic Address Parameter (GAP) number. The FWD may be the originally called number and when it forwards the call it becomes the new calling party number. The CPN may identify the dialing or calling number (e.g., the call originating number). The CHG may identify the number that was charged or billed for the specific dialing number. The CHG may also be referred to as Billing Telephone Number (BTN). For example, a business may have 10 CPNs and one CHG associated with all the 10 CPNs. The CLD may identify the dialed number (e.g., the call terminating number). The GAP may identify the dialed number when the dialed number is ported. In the ported scenario as described in more detail below, the dialed number may be replaced by the routing information of a switch serving the dialed number. The dialed number may be placed in the GAP field of the SS7 messages sent through the call path The data preparing process 71 reviews the CDRs to identify unique telephone numbers and creates a unique Telephone Number (TN) list (Step 504). In the actual operation, the processing of the CDRs into a unique TN list may involve going through the CDRs and extracting the unique permutations of various phone numbers into a unique TN list. The unique TN list may then be joined with a Local Number Portability (LNP) list and a VoIP number list maintained in the reference database 73 to identify ported numbers and VoIP numbers respectively (Steps 506 and 508). The data preparation process 71 may first stage the telephone numbers in the unique TN list to prepare the data for later of joining the telephone number with the external data in the database 73. The external data may include LERG data, local reference data, LNP data, and/or VoIP data. For example, as will be described below in more detail, LERG data describes all telephone numbers in North America. The North American Numbering Plan (NANA) phone numbers are in format of NPA-NXX-XXXX, where NPA identifies the area code, NXX identifies the Exchange within the NPA, and XXXX identifies the Line number. The telephone numbers may be stored in the LERG 6 database in a 7 digit format by, for example, NPA-NXX-X. The first digit of the Line number corresponds to a block number. The telephone numbers in the TN list, however, may be full 10 digit numbers. The staging foreign key in this scenario is the first 7 digits of the telephone number so that telephone numbers in the TN list can be joined with the LERG database.

The exemplary staging fields are as follows:

| STAGING FIELDS | DESCRIPTION |
| --- | --- |
| Foreign Key Fields | Inter-table relational data |
| Telephone Number Categories | Enrichment exception categories |
| Determine Forwarding Number | Select the best forwarding number |
| Improved Call Duration Calculations | Calculate enhanced call durations |

As noted above, the foreign key fields are generated in the staging table as inter-table relational data. The telephone number categories may provide enrichment exception categories. For example, the telephone number categories may provide the necessary exception information for LERG enrichment explaining why Assigned Carrier/Owner and State-LATA data is not available for that specific number. The forwarding number staging process may select the best forwarding number to be used downstream in the ONUM & DG selection process. There are two forwarding numbers provided in SS7, the first forwarding number and the last forwarding number. The forwarding number staging selects the best, the last if present, otherwise, the first one is selected. The improved call duration calculation staging may calculate enhanced call durations. To illustrate, there are two SS7 messages (e.g., Release (REL) and Release Clear (RLC)) that indicate that a call has been terminated. The existing system uses only one of the two SS7 messages (REL) to calculate the call duration. If the REL message does not exist, the existing system does not calculate duration. The improved call duration calculation of this application may check for the presence of either of these SS7 messages to identify when the call terminated, before failing to perform the call duration calculation. For example, the improved call duration calculation uses the RLC to calculate the duration in the case where REL is not present. In this manner, the traffic track system of this application results in a more accurate call duration determination.

Once the CDRs have been properly staged, the data preparation process 71 applies the LNP list to the TN list to identify the ported numbers (Step 506). The LNP list includes the list of ported numbers. The LNP list also includes routing information for the ported numbers. The routing information may refer to the LRN. The LRN may be a 10-digit telephone number and may identify the switch to which the call to the ported dialed number should be routed to, for reaching its destination. When a provider receives a request to port a telephone number from a new customer, that provider sends a request to the existing provider to initiate the porting process. The porting process may include either the new service provider or the existing service provider modifying the LNP database to include the correct LRN for the ported number. In one specific example, the LNP database may have the following fields:

| Table | Column |
| --- | --- |
| LNP_ACTIVE | NPANXXTN4_ID |
| LNP_ACTIVE | LRN_NPANXXB_ID |

The database lookup in the LNP database by the data preparation process 71 may be performed based on any individual number or all of the numbers present in the CDR. NPANXXTN4_ID is a database field name for the LNP foreign key used to join the TN list and the LNP database. The LNP database (e.g., the LNP_ACTIVE) includes a list of the ported numbers and their associated LRNs. In one implementation, the LNP database may be modified to include LERG information as well. The LERG data may describe network information about where the ported number is now deployed. For example, the LERG information may identify state, Local Access Transport Area (LATA), rate center, and carrier name & number associated with the LRN. The data preparation process 71 may stage the LNP data so that it can bring LERG information into the LNP database. The process of staging may correspond to creating value(s) required for performing lookups against data stored in the external databases (e.g., the LNP database). In this example, staging may include taking the first seven digits of the LRN (e.g., LRN_NPANXXB_ID=LRN LERG foreign key) for purposes of performing a join on or a comparison with the 7 digit numbers (NPA-NXX-B) of the LERG data (e.g., LERG 6) and identifying the LERG information associated with the LRN. To this end, when the data preparation process 71 performs a search for the ported number in the LNP database (e.g., the LNP_ACTIVE), the data preparation process 71 may also obtain, at the same time, the LERG information associated with the obtained LRN. That is, the LNP table in the database returns both the LRN associated with the ported number and the LERG information associated with the ported number's LRN. In another implementation, the data preparation process 71 may perform the LRN and LERG look up in two steps. The data preparation process 71 may first visit the LNP database to identify the LRN associated with the ported number and may then separately visit the LERG database to identify the LERG information associated with the LRN.

Upon application of LNP list to the TN list (Step 506), the data preparation process 71 identifies the ported numbers and enriches the calls in the TN list with the ported information (Step 510). Enriching the calls with the ported information may include adding ported information to the FWD, CPN, CHG, CLD, and GAP (e.g., GAP only in a case where CLD is seven digits & CLD is equal to LRN). The ported information may include the LRN associated with the ported number. The ported information may also include the LERG information as described above and as will be described in more detail below. The data preparation process 71 may use CDR enrichment fields to enrich the calls with the ported information. The CDR enrichment fields may be stored in the database 73. An exemplary CDR enrichment table identifying the enrichment fields is shown in the below-reproduced table.

| CDR ENRICHMENT FIELDS | DESCRIPTION |
|---|---|
| Calling Party Number LERG enrichment | Data from LERG 1, 6 & 8 associated w/CPN |
| Ported Calling Party Number LNP enrichment | Data from LNP associated w/Ported CPN |
| Ported Calling Party Number LERG enrichment | Data from LERG 1, 6 & 8 associated w/PCPN |
| Charge Number LERG enrichment | Data from LERG 1, 6 & 8 associated w/CHG |
| Ported Charge Number LNP enrichment | Data from LNP associated w/Ported CHG |
| Ported Charge Number LERG enrichment | Data from LERG 1, 6 & 8 associated w/PCHG |
| Called Number LERG enrichment | Data from LERG 1, 6 & 8 associated w/CLD |
| Ported Called Number LNP enrichment | Data from LNP associated w/Ported CLD |
| Ported Called Number LERG enrichment | Data from LERG 1, 6 & 8 associated w/PCLD |
| Jurisdiction Parameter LERG enrichment | Data from LERG 1, 6 & 8 associated w/JIP |
| Forwarding Number LERG enrichment | Data from LERG 1, 6 & 8 associated w/FWD |
| Ported Forwarding Number LNP enrichment | Data from LNP associated w/Ported FWD |
| Ported Forwarding Number LERG enrichment | Data from LERG 1, 6 & 8 associated w/PFWD |

As shown, the data preparation process 71 may perform ported CPN LNP enrichment, ported CHG LNP enrichment, ported CLD LNP enrichment, and ported FWD LNP enrichment. The ported CPN LNP enrichment may correspond to enriching the ported CPN with the LRN data obtained from LNP database. The ported CHG LNP enrichment may correspond to enriching the ported CHG with the LRN data obtained from the LNP database. Similarly, the ported CLD LNP enrichment and the ported FWD LNP enrichment may correspond to enriching the ported CLD and ported FWD with LRN data obtained from the LNP database, respectively. The data preparation process 71 may also perform the LERG enrichment of the CPN, CHG, CLD, and FWD. Specifically, for each LRN added to the TN list, the data preparation process 71 may perform lookups against LNP database or the LERG database to add LERG data to the CDR for CPN, CHG, CLD, FWD, HP, and GAP. LERG data is also added for ported numbers (e.g., each previously listed number's associated LRNs if they exist). The fields to be added to the CDR for CPN, CHG, CLD, and FWD may include code type, LATA, rate center name, switch, operating company number, and/or operating company name.

The data preparation process 71 applies the VoIP number list to the TN list to identify the Verizon originating or terminating VoIP calls/numbers (Step 508). There may be several operating systems that provision VoIP lines and provide the traffic track system of the instant application with the newly provisioned VoIP numbers periodically (e.g., weekly or monthly) to maintain a current list of active Verizon VOID telephone numbers. This data may be stored in a VoIP number list, which may be maintained in the external database 73. In one specific example, the VoIP number list may have the following fields:

| Table | Column |
|---|---|
| VOIP_NUMBERS_REF | NPANXXTN4_ID |
| VOIP_NUMBERS_REF | SVC-TY |

The data preparation process 71 checks the VoIP number list to determine whether the originating number or the terminating number (e.g., NPANXXTN4_ID) is a VoIP number. If so, the data preparation process 71 may then determine the service type (e.g., SVC_TY) associated with the VOID number. The service type may include, for example, FIOS Digital Voice (FDV) and/or Fiber to the Premises-Session Initiation Protocol (FTTP-SIP) for Verizon™ subscribers. In one implementation, the FDV numbers may be added to the VoIP number list from one source, and the FTT-SIP numbers may be added to the VoIP number list from another source. The source of the VoIP number may be reflected in the VoIP number list. Therefore, when a VoIP lookup is performed, the source of the VoIP data can be easily identified. In another implementation, the FDV numbers and the FTT-SIP numbers may be added to the VoIP number list from the same source. If the number is not included in the VoIP number list, the originating number or the terminating number may be considered as belonging to a standard Time Division Multiplexing (TDM) line. To this end, the traffic track system of this application can distinguish whether or not the originating and/or terminating numbers associated with Verizon™ are VoIP numbers. Furthermore, for the originating and/or terminating numbers not associated with Verizon™, the traffic track system of this application may use the LERG7 and other external sources (e.g., Telcordia Technologies System Documentation [BR-751-100-460] COMMON LANGUAGE® Location Codes (CLLI™ Codes)-Switching System Codes) to identify whether the switches associated with these non Verizon numbers are VoIP capable. The LERG7 identifies the switch code and the switch type and the Telecordia source may be used to identify whether or not the switch type is a packet capable switch type.

Upon application of the VoIP number list to the TN list (Step 508), the data preparation process 71 identifies the VoIP numbers and enriches the calls with the VoIP information (Step 512). Enriching the calls with the VoIP information may include adding VoIP indicator to the originating and terminating side of call if the number is in the VoIP number list. The VoIP indicator may be a flag indicating the number is a VoIP number and identifying the service type associated with the number. This information may later be used to measure the percentage of VoIP traffic contained in the measured call flow between Verizon's network and interconnecting carriers. For example, the data may be used to identify how much traffic is being received at the LEC, ILEC, CLEC, IXC, or wireless carrier from a Verizon™ VoIP line and how much traffic is being sent to a Verizon™ VoIP line from the LEC ILEC, CLEC, IXC, or wireless carrier. The VoIP traffic may travel through soft switches of the LEC and information about them may be collected there and passed to the database 61. To illustrate, in one specific example, Verizon™ uses its soft-switches as gateways for FDV traffic to reach the PSTN where the SIP calls are native to soft-switches.

Moving forward, the data preparation process 71 may create an enriched CDR table (Step 514). The enriched CDR table may be created by applying all calls enriched with the LRN and all calls enriched with the VoIP information to identify a table that identifies the ported calls and the VoIP calls. The data preparation process 71 then performs block enrichment on the enriched CDR table (Step 518), further enriching the CDR with data from LERG database and the local database. The block enrichment process is described with respect to FIG. 6. After the block enrichment, the data preparation process 71 outputs enriched super CDRs (Step 522). The data preparation process 71 also creates a block summary from the super CDRs table. The difference between the block summary table and the super CDR table is the level of call detail kept in each table. The super CDR table keeps all 10 digits of each telephone numbers and the block table keeps 7 digits of each telephone numbers. For example, the super CDR table may include TN 508-624-1190 and the block table may include only 508-624-1. The block table may also summarize multiple records into one. To illustrate, assume two neighbors living next to each other and having two separate telephone numbers call the same number (e.g., their local bank). The calling numbers may have the same NPA and NXX; however, the last four digits may be different from each other (e.g., one is 1001 and another is 1002). As a result, two separate super CDR records are generated for the calls—one record for 1001 number and another record for 1002 number. Now, if the last three digits of the numbers are dropped as part of creating a block summary, the two records are summarized into one record with the summarized calling number being equal to NPA-NXX-1 and the call count being 2 and summarized record's call duration would be the sum of the duration of the two calls.

Figure 6:
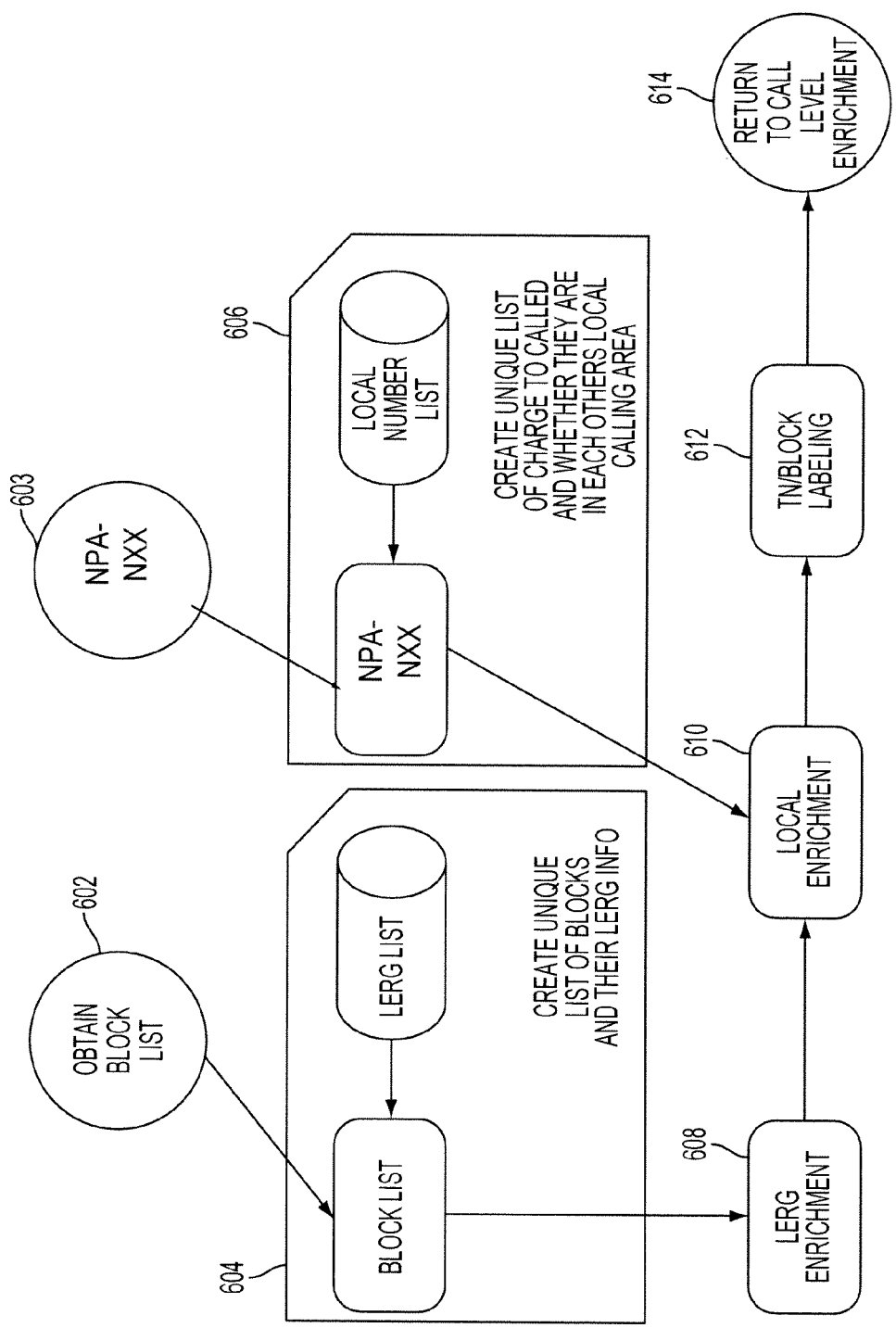
FIG. 6 illustrates another data preparation operation using reference data for enriching original call records from the relational database with LERG information and local call information.

FIG. 6 illustrates another data preparation operation using reference data 73 for enriching original call records from the relational database 60 (e.g., the SS7 CDRs) with the LERG information and locality information. At the block level, FWD, CNP, CHG, CLD and GAP may be used to create a unique block list. The block list may be joined with LERG information to enrich calls with information about the owner of the block such operating company number (OCN) of the originating or terminating carrier, respectively, in the CDR, OCN name (e.g., carrier name/owner of OCN), state, LATA, and common language location identifier (CLLI). LERG6 contains an inventory of active NANP numbers. The LRN associated with the ported number points to LERG6 identifying the switch to which the call should be routed to for reaching its destination. Also, local lookups may be done to identify NPA-NXX pairs for local call jurisdictions.

In the block enrichment process, the data preparation process 71 obtains the block list (Step 602) and joins the block list with a LERG list maintained in the reference database 73 to enrich calls with LERG information (Step 604). As noted above, the block list may be obtained by keeping 7 digits of the enriched CDRs (e.g. Step 514). The LERG list may include LERG6_Expanded list, which includes data from LERG 1, 6, & 8 databases. The data preparation process 71 uses CDR enrichment fields to enrich the blocks in the block list with the LERG information (Step 608). An exemplary CDR enrichment table was shown above. As shown, the LERG enrichment includes a CPN LERG enrichment, a ported CPN LERG enrichment, a CHG LERG enrichment, a ported CHG LERG enrichment, a CLD LERG enrichment, a ported CLD LERG enrichment, a Jurisdiction Parameter LERG enrichment, a FWD LERG enrichment, and a ported FWD LERG enrichment. In one specific example, the LERG database may have the following fields:

| Table | Column |
|---|---|
| LERG6_EXPAND | NPANXXBLOCK_ID |
| LERG6_EXPAND | COC_TYPE |

The first field under the column tab corresponds to the foreign key necessary to harvest information from the LERG database table. The foreign key is used to create a link to the LERG reference data. The LERG reference data for example may include the code type (e.g., COC-Type). The code type may refer to the application associated with the telephone number. For example, certain code types may refer to toll free numbers, operator services, information services, etc. The carrier type is found in OCN_CAT, Wireless, ILEC, CLEC, RBOC, etc. Other LERG information identified above are not discussed here in more detail.

The data preparation process 71 obtains the numbers at the NPA-NXX level (Step 603) and applies them to the local number list to identify the local numbers (Step 606). The local number list identifies the local numbers. If both the CPN NPA-NXX and the CLD NPA-NXX are found paired in the local number list, the data preparation process 71 may determine that the associated call is a local call. If the CPN NPA-NXX-CLD NPA-NXX pairing is not in the local number list, the data preparation process 71 may determine that the call is not a local call. In one specific example, the local number list may have the following fields:

| Table | Column |
|---|---|
| LOCAL_REF | CALLINGNPAXX |
| LOCAL_REF | CALLEDNPANXX |

The CALLINGNPAXX identifies the rate center where the best originating number resides and the CALLEDNPANXX identifies the rate center where the best terminating number resides. If the originating and terminating rate centers associated with the best originating and terminating numbers are specified as local in the local reference data, then the data preparation process 71 may consider the call to be a local call. Otherwise, the call may be considered to be not a local call.

Upon application of the local number list to the block list (Step 606), the data preparation process 71 identifies whether or not a specific originating to terminating number combination constitutes a local call and whether they are in each other's local calling area. Based on this determination, the data preparation process 71 enriches the call with the local information (Step 610). Enriching the calls with the local information may include adding a flag to the call reflecting that the call is a local call. The data preparation process 71 then creates an enriched block table. The enriched block may be created by combining the blocks enriched with the LERG information and the blocks enriched with the local information to create a table that holds blocks enriched with LERG information and/or local information. The data preparation process 71 then identifies the ownership and jurisdiction associated with the originating and terminating numbers (Step 612) and returns to call level enrichment in FIG. 5 (Step 614).

The data preparation process 71 may use two different methods for identifying ownership and jurisdiction. For ownership, the data preparation process 71 may use the Originating Number (ONUM) and Terminating Number (TNUM) to identify the owning carrier of the originating and terminating numbers. The data preparation process 71 may use the relationship between Dialing (DG) and Dialed (DD) numbers to jurisdictionalize the call. The difference is that in identifying jurisdiction, ported numbers may not be considered when selecting DG and DD. This may be because some switches serving ported numbers may serve more than one rate center, but use only one LRN. A rate center may define a geographic region within which the number may be ported. Therefore, the switch serving multiple rate centers with a single LRN may introduce error into the jurisdiction process as some ported numbers may be mapped to LRN's rate center and not their own rate center.

The data preparation process 71 may identify ONUM, TNUM, DG, and DD based on the enriched CDRs. In one specific example, the data preparation process 71 performs several actions on the enriched CDRs to identify the ONUM, TNUM, DG, and DD. The actions are shown in the below-reproduced table.

specific example, the LEC may receive million calls from a CLEC (or any carrier type) within a specific period of time (e.g., a month). However, not all the million calls may have been originated from the CLEC and some may have been originated from other carriers and passed to the CLEC for delivery to the LEC. The traffic track system of the instant application utilizes the ONUM OCN, obtained from the LERG data, to identify the originating carriers that pass their traffic to the CLEC for routing to the LEC and assign the ownership of this traffic accordingly. This is an improvement over the existing technology that simply assigns originating carrier ownership based on the owner of the physical switch (e.g., CLEC) handing the traffic to the LEC. The distinction is important, especially when billing for the call based on ownership is considered and when making transit traffic determination.

| ACTION FIELD | DESCRIPTION |
| --- | --- |
| ONUM: Originating Number | Select optimal ONUM to identify Originating Carrier and all of that number's enrichment data |
| TNUM: Terminating Number | Select optimal TNUM to identify Terminating Carrier and all of that number's enrichment data |
| DG_NUM: Dialing Number | Select optimal ONUM to determine Call Jurisdiction and all of that number's enrichment data |
| DD_NUM: Dialed Number | Select optimal TNUM to determine Call Jurisdiction and all of that number's enrichment data |
| Traffic Track Call Jurisdiction | Originating & Terminating State & LATA relationships combined with DG_NUM to DD_NUM Local Indicator |
| Traffic Track Transit Flag | If neither Originating or Terminating carrier is Verizon, the call is a Transit Network Call: Different Call Jurisdiction bucket |
| Traffic Track Toll Free Call Flag | Mark calls as Toll Free Originating or Terminating or Both: Different Call Jurisdiction bucket |
| Orig. & Term. VoIP Service Indicators | For Vz numbers, Non-VoIP, VoIP Type FDV or VoIP Type SIP |
| Orig. & Term. VoIP Service Indicators | For Non-Vz numbers, Carrier Switch is or is not Voip Capable |
| Summarize Call Count | Number of calls |
| Summarize Minutes of Use | Summed Call Duration in Minutes Of Use (MOU) |

In one specific example, for calls from CLEC to LEC, the data preparation process 71 uses ONUM to establish originating call ownership. The following rules may be used in the stated order to identify optimal ONUM: (1) if the FWD number is valid and it is found in the LNP database, then assign the LRN of the forwarding number (e.g., ported FWD) to ONUM; (2) if the FWD number is valid and is not found in the LNP database, the assign the FWD number to the ONUM; (3) if the FWD number is null or invalid and the CPN is valid and it is found in the LNP database, then assign the LRN of the CPN (e.g., ported CPN) to the ONUM; (4) if the FWD number is null or invalid, the CPN is valid and it is not found in the LNP database then assign the CPN to the ONUM; (5) if both the FWD number and the CPN are null or invalid, the CHG number is valid and is found in the LNP database, then assign the LRN of the CHG number (ported CHG) to the ONUM; and (6) if both the FWD number and the CPN are null or invalid, the CHG number is valid and is not found in the LNP database, then assign the CHG number to the ONUM; (7) if each of the FWD number, CPN, and CHG number are null or invalid, then assign the JIP as ONUM; and (8) if each of the FWD number, CPN, CHG, and JIP are null or invalid, then assign null to the ONUM. The originating OCN is assigned based on the selected ONUM.

Using the foregoing rules to identify the ONUM and the originating OCN from the enriched CDRs, the traffic track system of the instant application can distinguish the routing carrier from the true originating carrier. To illustrate one Assume for example, the LEC makes a special deal with the CLEC to give them a low rate to pass traffic back and forth between the LEC and CLEC. The CLEC may then solicit other carriers to give the CLEC traffic, which the CLEC would in turn pass to the LEC, thereby passing the savings to other carriers and in turn increasing revenue for itself by carrying more traffic and decreasing the revenue for LEC. Under the existing traffic track system, the LEC may not recognize that some of the traffic is being originated from outside of the CLEC and as such may not bill them at a higher rate. However, the traffic track system of the instant application assigns ownership based on the ONUM and not the physical switch that is passing the traffic to the LEC. Therefore, the traffic track system of the instant application can identify such the true owners of such traffic and may be able to bill them accordingly.

In another specific example, for calls from LEC to CLEC, the data preparation process 71 process uses TNUM to establish call terminating ownership. The called number field from the CDR may be used to assign TNUM and TNUM is used to assign the OCN. The called number field may contain the LRN for a ported call or the dialed digits for a non-ported call. The LRN may be used as the TNUM for the ported call and the dialed digits may be used as the TNUM for the non-ported call.

The DG and DD numbers correspond to the ONUM and TNUM respectively, except ported numbers may not be considered when selecting DD and DG. For example, the following rules may be considered for selecting the DG in the stated order: (1) if the FWD number is valid, the DG is the FWD number regardless of whether or not the forwarding number is ported; (2) if the FWD number is null or invalid and the CPN is valid, the DG is the calling number regardless of whether or not the CPN is ported; (3) if both the FWD number and the CPN are null or invalid and CHG number is valid, the DG is the CHG number regardless of whether the CHG number is ported or not; (4) if each of the FWD number, CPN, and CHG number are null or invalid and JIP is valid, the DG is the JIP; and (5) if none are present or valid, DG will be null. The called number field from the CDR may be used to assign DD. The called number field may contain the LRN for a ported call or the dialed digits for a non-ported call. If the call is ported, the dialed digits are placed in the GAP field and the data preparation process 71 uses the GAP field to assign the DD.

The data preparation process 71 also sets the transit flag. If a call terminating to the Verizon™ network from a third party carrier has an IXC Carrier ID Code (CIC), the call is being passed on to an interexchange carrier and is not terminating within the Verizon™ network and is thus a transit call. The CIC is used to route calls to long-distance carriers. The CIC is a preliminary routing code that overrides the dialed telephone number. The user's line record, stored in the local switch, contains the CIC associated with the user's long-distance carrier of choice. The user can also select a CIC manually at the time of the call. When the user makes a long distance call, the switch recognizes that the dialed number is leaving its LATA based on the area code associated with the called number. Alternatively, the call may be an Intra-LATA toll call, i.e. not leaving the LATA but still going to an IXC and thus not terminating in the Verizon Network and as such being a transit call. The switch then includes the CIC in the SS7 call set-up message and routes the call to the access tandem responsible for routing the call to the long-distance carrier. The tandem switch then uses the CIC to route the call to the correct long distance carrier. If a call terminating to the Verizon™ network from a third party carrier has no CIC and a TNUM that does not belong to Verizon™, then the call is not terminating within the Verizon™ network and is, again, a transit call. If a call terminating to the Verizon™ network from a $3^{rd}$ party carrier has a no CIC and a TNUM that belongs to Verizon™, then the call is terminating within the Verizon™ network and the call is not a transit call. If a call originating from Verizon™ bound for a third party carrier and the ONUM is not a Verizon™ number then the call did not originate from within the Verizon™ network is thus a transit call. If a call originating from Verizon™ bound for a third party carrier and the ONUM is a Verizon™ number then the call did originate from within the Verizon™ network is not a transit call.

To this end, the data preparation process 71 enriches the calls in the CDR table by application of the reference data (e.g., LNP data, VoIP data, LERG data, and local data) obtained from the database 73. The processed call details information is then uploaded to the decision support database 80. The decision support database may be a relational database (e.g., Oracle or Vertica). The decision support database 80 analyzes the prepared call details and compiles data into reports published online via web pages accessible to a user's terminal 9. The decision support database 80 provides certain report management tools as well as the user interface. For example, the decision support database 80 receives the inputs and presents outputs via the user terminal 9, to set-up specific reports.

The decision support database 80 captures and stores super CDR enriched with LERG information, local information, LNP information, and VoIP information and displays it through the user terminal 9 in a variety of ways. The decision support database may produce Verizon™ originating and terminating summary reports for specific CLEC, ILEC, IXC and Wireless carriers. As a specific example: the Verizon™ terminating ILEC report (e.g., from Verizon™ to ILEC) may be based on the fields shown below:

| Verizon ™ Originating Summary Report Fields | Description |
| --- | --- |
| CARRIER_CD | Carrier/LATA Code |
| DIALED_LATA | Terminating LATA |
| DIRECTION | Vz-to-ILEC |
| TNUM_OCN | Terminating Carrier OCN |
| TNUM_TY | ILEC, CLEC, 3rdParty |
| TNUM_CARRIER | Term Carrier Name |
| _JUR | Jurisdiction |
| TOLL_FREE | Toll Free Indicator |
| IAM_CALLS | Summed call count |
| IAM_MOU | Summed call duration (MOU), call set up to call take down |
| ANM_MOU | Summed call duration (MOU), call answer to call take down |
| % AMOU | Percent answered MOU |

The Verizon™ originating summary report describes traffic originating from Verizon™ to an Independent Local Exchange Carrier (ILEC). The report includes various fields as listed in the 'Report Fields' column above, along with their associated description as shown in the 'Description' column. For example, the report includes a CARRIER_CD field, which identifies the ILEC carrier name and geography of operation. The report also includes a DIRECTION field, which identifies the direction of traffic for this particular report (e.g., from Verizon™ to the ILEC). The direction may be determined based on whether the Verizon™ switch is the terminating or the originating point code, respectively, in the CDR. The report also includes a TNUM OCN field, which identifies the terminating carrier OCN (e.g., Frontier™) as opposed to the routing carrier which is identified by the carrier code. The report also includes an ILEC_JUR field, which identifies the jurisdiction associated with the calls to the ILEC. For example, some calls may be jurisdictionalized as local, whereas other calls may be jurisdictionalized as interstate InterLATA access, intrastate InterLATA access, intrastate IntraLATA access, transit InterLATA, or transit. The report also includes TOLL_FREE indicator, identifying the calls that are toll free. The report also includes traffic volume sums, for example, IAM_CALLS, IAM_MOU, ANM_MOU, and % AMOU fields each respectively identifying, the number of calls, the total minutes of use (MOU), the total minutes of used after the calls are answered, and percent of answered minutes of use.

In another specific ILEC report example, the decision support database may produce a Verizon™ terminating summary report based on the fields shown below:

| Verizon ™ Terminating Summary Report Fields | Description |
| --- | --- |
| CARRIER_CD | Carrier/LATA Code |
| DIALING_LATA | Originating LATA |
| DIRECTION | ILEC-to-Vz |
| ONUM_OCN | Originating Carrier OCN |
| ONUM_TY | ILEC, CLEC, 3rdParty |
| ONUM_CARRIER | Originating Carrier Name |
| ILEC_JUR | Jurisdiction |
| TOLL_FREE | Toll Free Indicator |
| IAM_CALLS | Summed call count |

| Verizon ™ Terminating Summary Report Fields | Description |
| --- | --- |
| IAM_MOU | Summed call duration (MOU), call set up to call take down |
| ANM_MOU | Summed call duration (MOU), call answer to call take down |
| % AMOU | Percent answered MOU |

The Verizon™ terminating ILEC summary report describes traffic terminating to Verizon™ (e.g., from ILEC to Verizon™). The report includes various fields as listed in the 'Report Fields' column above along with their associative description as shown in the 'Description' column. In keeping with the previous example, the report includes a CARRIER_CD field, which identifies the ILEC carrier name and geography of operation. The report also includes a DIRECTION field, which identifies the direction of traffic for this particular report (e.g., from the ILEC to Verizon™). The report also includes a ONUM OCN field, which identifies the originating carrier OCN (e.g., Frontier™) as opposed to the routing carrier which is identified by the carrier code. The report also includes a ILEC_JUR field, which identifies the jurisdiction associated with the calls received from the ILEC. The report also includes traffic volume sums, for example, IAM_CALLS, IAM_MOU, ANM_MOU, and % AMOU fields each respectively identifying, the number of calls, the total minutes of use, the total minutes of use after the calls are answered, and percent of answered minutes of use.

In another ILEC report example, the decision support database may produce a Verizon™ originating summary report that includes additional fields associated with carrier identification and call jurisdiction, such as: state, LATA and rate center based as shown below:

| Verizon ™ Originating Summary Report Fields | Description |
| --- | --- |
| CARRIER_CD | Carrier/LATA Code |
| DIRECTION | Vz-to-ILEC |
| TOLL_FREE | Toll Free Indicator |
| ILEC_JUR | Jurisdiction |
| ONUM | Originating NPA-NXX |
| ONUM_OCN | Originating Carrier OCN |
| ONUM_CARRIER | Originating Carrier Name |
| TNUM | Terminating NPA-NXX |
| TNUM_OCN | Terminating Carrier OCN |
| TNUM_TY | ILEC, CLEC, 3rdParty |
| TNUM CARRIER | Term Carrier Name |
| DIALING | Originating NPA-NXX |
| DIALING_ST | Originating State |
| DIALING_LATA | Originating LATA |
| DIALING_RC | Originating Rate Center |
| DIALED | Terminating NPA-NXX |
| DIALED_ST | Terming State |
| DIALED_LATA | Terminating LATA |
| DIALED_RC | Term Rate Center |
| IAM_CALLS | Summed call count |
| IAM_MOU | Summed call duration (MOU), call set up to call take down |
| ANM_MOU | Summed call duration (MOU), call answer to call take down |

The highlighted fields above are the additional fields. For example, the additional fields include ONUM, ONUM_OCN, and ONUM_CARRIER, which respectively identify the originating NPA-NXX, the originating carrier OCN, and the originating carrier name. The additional fields also include DIALING, DIALING_ST, and DIALING_LATA, DIALING_RC, which respectively identify the originating NPA-NXX, originating state, originating LATA, and originating rate center. The originating rate center describes the rate center from which the call originates. The additional fields also include DIALED, DIALED_ST, DIALED_LATA, and DIALED_RC, which respectively identify the terminating NPA-NXX, terminating state, terminating LATA, and terminating rate center. The terminating rate center describes the rate center to which the call terminates. The additional detail included in these reports enable billing analysts to ensure that the appropriate call types are being delivered to the ILEC and that the traffic volumes are being billed properly.

In another ILEC report example, the decision support database may produce a Verizon™ terminating summary report that includes additional fields associated with carrier identification and call jurisdiction, identical to the originating report described above:

| Verizon ™ Terminating Summary Report | Description |
| --- | --- |
| CARRIER_CD | Carrier/LATA Code |
| DIRECTION | Vz-to-ILEC |
| TOLL_FREE | Toll Free Indicator |
| ILEC_JUR | Jurisdiction |
| ONUM | Originating NPA-NXX |
| ONUM_OCN | Originating Carrier OCN |
| ONUM_TY | ILEC, CLEC, 3rdParty |
| ONUM_CARRIER | Originating Carrier Name |
| TNUM | Terminating NPA-NXX |
| TNUM_OCN | Terminating Carrier OCN |
| TNUM_CARRIER | Terminating Carrier Name |
| DIALING | Originating NPA-NXX |
| DIALING_ST | Originating ST |
| DIALING_LATA | Originating LATA |
| DIALING_RC | Originating Rate Center |
| DIALED | Terminating NPA-NXX |
| DIALED_ST | Terminating ST |
| DIALED_LATA | Terminating LATA |
| DIALED_RC | Terminating Rate Center |
| IAM_CALLS | Summed call count |
| IAM_MOU | Summed call duration (MOU), call set up to call take down |
| ANM_MOU | Summed call duration (MOU), call answer to call take down |

The highlighted fields above are the additional fields. The highlighted fields are similar to the highlighted fields described above with respect to the Verizon™ originating summary report. Therefore, for the sake of brevity of description and simplicity, they are not described in more detail. Again, the additional detail included in these reports enable billing analysts to ensure that the appropriate call types are being delivered to the ILEC and that the traffic volumes are being billed properly.

In another ILEC report example, the decision support database may produce a Verizon™ terminating ILEC report which is limited to only transit calls without a interexchange carrier identification code as shown below:

| Verizon ™ Terminating No CIC Transit Summary Report | Description |
| --- | --- |
| DIRECTION | ILEC-to-Vz |
| CARRIER_CD | Carrier/LATA Code |
| ONUM_TY | ILEC, CLEC, 3rdParty |
| OPC | Originating Switch Address |
| OPC_CLLI | Originating Switch Code |
| DPC | Terminating Switch Address |
| DPC_CLLI | Terminating Switch Code |
| CIC | IXC Carrier ID = N |

-continued

| Verizon ™ Terminating No CIC Transit Summary Report | Description |
|---|---|
| TT_TX | Transit Call Indicator = T |
| JUR | Call Jurisdiction |
| DIALING_ST | Originating State |
| DIALING_LATA | Originating LATA |
| DIALING_RC | Originating Rate Center |
| DIALED_ST | Terminating State |
| DIALED_LATA | Terminating LATA |
| DIALED_RC | Terminating Rate Center |
| TNUM_OCN | Terminating Carrier OCN |
| TNUM_CARRIER | Terminating Carrier Name |
| IAM_CALLS | 2 |
| IAM_MOU | 4.10 |
| ANM_MOU | 3.82 |

This summary report may be used to identify all call volumes made from the ILEC to Verizon™ which are not routed to an Interexchange Carrier (IXC) such as AT&T or Sprint and do not terminate within the Verizon Network. To this end, these calls do not include an IXC Carrier ID code (CIC) and all have the transit flag set to true.

Other reports may be generated based on different fields and/or various other combinations of the fields described above. FIGS. 7A-7D shows the various fields which may be used to generate different reports from the enriched calls of the super CDR. FIG. 7A illustrates a table 710 showing the carrier (e.g., Verizon™) originating OCN report field descriptions and a table 712 showing the carrier (e.g., Verizon™) terminating OCN report field descriptions. FIG. 7B illustrates a table 720 showing the carrier (e.g., Verizon™) originating/terminating LIB detail report filed descriptions and a table 722 showing the carrier (e.g., Verizon™) VoIP report field descriptions. FIG. 7C illustrates a table 730 showing the carrier (e.g., Verizon™) originating/terminating full interconnection report field descriptions. FIG. 7D illustrates a table 740 showing the carrier (e.g., Verizon™) terminating direct observed PVU report field description and a table 742 showing the carrier (e.g., Verizon™) originating/terminating wireless jurisdiction report field descriptions. The fields shown in FIGS. 7A-7D are self explanatory and as such are not described here in more detail for the sake of brevity of the description.

In one general aspect, the instant application describes receiving, at a processor, call records from telecommunication network and loading the call records into a telephone number (TN) list; obtaining, from a reference database, Local Routing Number (LRN) data identifying ported numbers and applying the LRN data to the call records to enrich the call records with ported information; obtaining, from the reference database, Local Exchange Routing Guide (LERG) data associated with the LRN data and applying the LERG data to the call records to enrich the call records with LERG information; distinguishing an originating carrier from a routing carrier for the call records based on the LERG information enriching the call records, the originating carrier being a carrier originating a call and passing the call to the routing carrier for delivery to a next destination of the call; distinguishing a terminating carrier from the routing carrier for the call records based on the LERG information enriching the call records, the terminating carrier receiving the call from the routing carrier and terminating the call; and assigning ownership to the call records based on the originating carrier and the terminating carrier.

The above general aspect may include one or more of the following features. Receiving the call records may include receiving Signaling System Seven (SS7) Call Detail Records (CDRs) received from Signal Transfer Points (STPs) for interoffice calls from central office switches of the network for intra-office calls. The ported information may include the LRN associated with ported calls in the TN list. The LERG data may include state, LATA, rate center, and carrier name associated with the LRN. Distinguishing the originating carrier from the routing carrier may include using the call records enriched with the LERG and LNP information to identify an Originating Number (ONUM) for a call from a Competitive Local Exchange Carrier (CLEC) to a Local Exchange Carrier (LEC) and assigning the originating carrier to an owner of the ONUM.

The ONUM for the call may be assigned in accordance with following logic rules: (1) if a valid forwarding number is present in the call and the forwarding number is found in a Local Number Portability (LNP) database, the ONUM is an LRN associated with the forwarding number; (2) if a valid forwarding number is present in the call and the forwarding number is not found in the LNP database, the ONUM is the forwarding number; (3) if a valid forwarding number is not present in the call and a valid calling number is present in the call and in the LNP database, the ONUM is an LRN associated with the calling number; (4) if a valid forwarding number is not present in the call and a valid calling number is present in the call and not present in the LNP database, the ONUM is the calling number; (5) if neither a valid forwarding number nor a valid calling number are present in the call and a valid charge number is present in the call and in the LNP database, the ONUM is an LRN associated with the charge number; (6) if neither a valid forwarding number nor a valid calling number are present in the call and a valid charge number is present in the call and not present in the LNP database, the ONUM is the charge number; (7) if no valid forwarding number, valid calling number, or valid charge number are present in the call and a valid JIP number is present, the ONUM is the JIP number; and (8) if no valid forwarding number, valid calling number, valid charge number or valid JIP are present in the call, the ONUM is set to null.

The method may further include a step of setting a transit flag for the call records in the TN list using the LERG information. For calls from a CLEC or an ILEC to a LEC, the transit flag may be set in accordance with following logic rules: (1) if an Interexchange Carrier ID Code (CIC) is present in a call, the call is a transit call and the transit flag is set to true; (2) if the CIC Code is not present in the call and a Terminating Number (TNUM) is not associated with the LEC, the call is the transit call and the transit flag is set to true; and (3) if the CIC Code is not present in the call and the TNUM is associated with the LEC, the call is not a transit call and the transit flag is set to false. For calls from a LEC to a CLEC or an ILEC, the transit flag may be set in accordance with following logic rules: (1) if an ONUM is not associated with the LEC, the call is a transit call and the transit flag is set to true; and (2) if the ONUM is associates with the LEC, the call is not a transit call and the transit flag is set to false.

The method may further include steps of obtaining, from the reference database, Voice over IP (VoIP) data identifying Verizon VoIP numbers and applying the VoIt) data to the call records to enrich the call records with VoIP information; and obtaining, from the reference database, VoIP data identifying non-Verizon numbers based on ONUM and TNUM switch type as determined from LERG7, LERG7SHA, or Telecordia documentation. The method may further include a step of assigning jurisdiction to the call records based on whether or not a Dialing (DG) number and a Dialed (DD) number associated with each of the call records are assigned to rate centers that are determined to be in same local calling area.

The DG number for the call may be assigned in accordance with following logic rules: (1) if a valid forwarding number is present, the DG number is the valid forwarding number regardless of whether or not the forwarding number is ported; (2) if a valid forwarding number is not present and a valid calling number is present in the call, the DG is the calling number regardless of whether or not the calling number is ported; (3) if neither a valid forwarding number nor a valid calling number are present in the call and a valid charge number is present in the call, the DG is the charge number regardless of whether or not the charge number is ported; (4) if no valid forwarding number, valid calling number, or valid charge number are present in the call and a valid JIP number is present, the DG is the JIP number; and (5) if no valid forwarding number, valid calling number, valid charge number or valid JIP are present in the call, the DG is set to null.

The DD number for the call may be assigned in accordance with following logic rules: (1) if the call has been LNP dipped by the network and found ported, then the Generic Address Parameter (GAP) is assigned to the DD number if the GAP is a 10 digit number (for ported calls, the SS7 network moves the Called Number data to the GAP and places the LRN into the Called Number field of the IAM); (2) if the call has been LNP dipped by the network and found ported, then the Enriched Called Number is assigned to the DD if the GAP is a 7 digit number (the Enriched Called Number contains Called Number which, if 7-digits, may have had enhanced by adding the missing NPA); (3) if the call has been LNP dipped by the network and found to be not ported, the DD is set to the Called Number if the Called Number is a 10 digit number; (4) if the call has been LNP dipped by the network and found to be not ported, the DD is the Enriched Called Number if the Called Number is a 7-digit number; (5) if the call has not been LNP dipped by the network, the DD is the Called Number if the Called Number is a 10 digit number; and (6) if the call has not been LNP dipped by the network, the DD is the Enriched Called Number if the Called Number is a 7 digit number.

The above general aspect may include one or more of the following features. Distinguishing the terminating carrier from the routing carrier may include using the call records enriched with the LERG information to identify a Terminating Number (TNUM) and assigning the terminating carrier to an owner of the TNUM. The TNUM for the call may be assigned in accordance with following logic rules: (1) if the call has been LNP dipped and found to be ported, the TNUM is a number appearing in a Called Number filed associated with the call, the number being an LRN associated with the call; (2) if the call has been LNP dipped and found to be not ported, the TNUM is a Called Number if the called number is a 10 digit number; (3) if the call has been LNP dipped and found to be not ported, the TNUM is the Enriched Called Number if the Called Number is a 7 digit number, the Enriched Called Number may include the missing NPA information; (4) if the call has not been LNP dipped by the network, the Called Number is looked up in the LNP reference data and if found to be ported, the LRN is used for the TNUM; (5) if the call has not been LNP dipped by the network, the Called Number is looked up in the LNP reference data and if found not to be ported, the Called Number is used for the TNUM if the Called Number is a 10 digit number; and (6) if the call has not been LNP dipped by the network, the called number is looked up in the LNP reference data and if found not to be ported, the Enriched Called Number is used for the TNUM if the Called Number is a 7 digit number.

These general and specific aspects may be implemented using a system, a method, a computer program, a computer readable medium, or an apparatus or any combination of systems, methods, computer programs, computer readable mediums, and/or apparatuses.

Figure 2B:
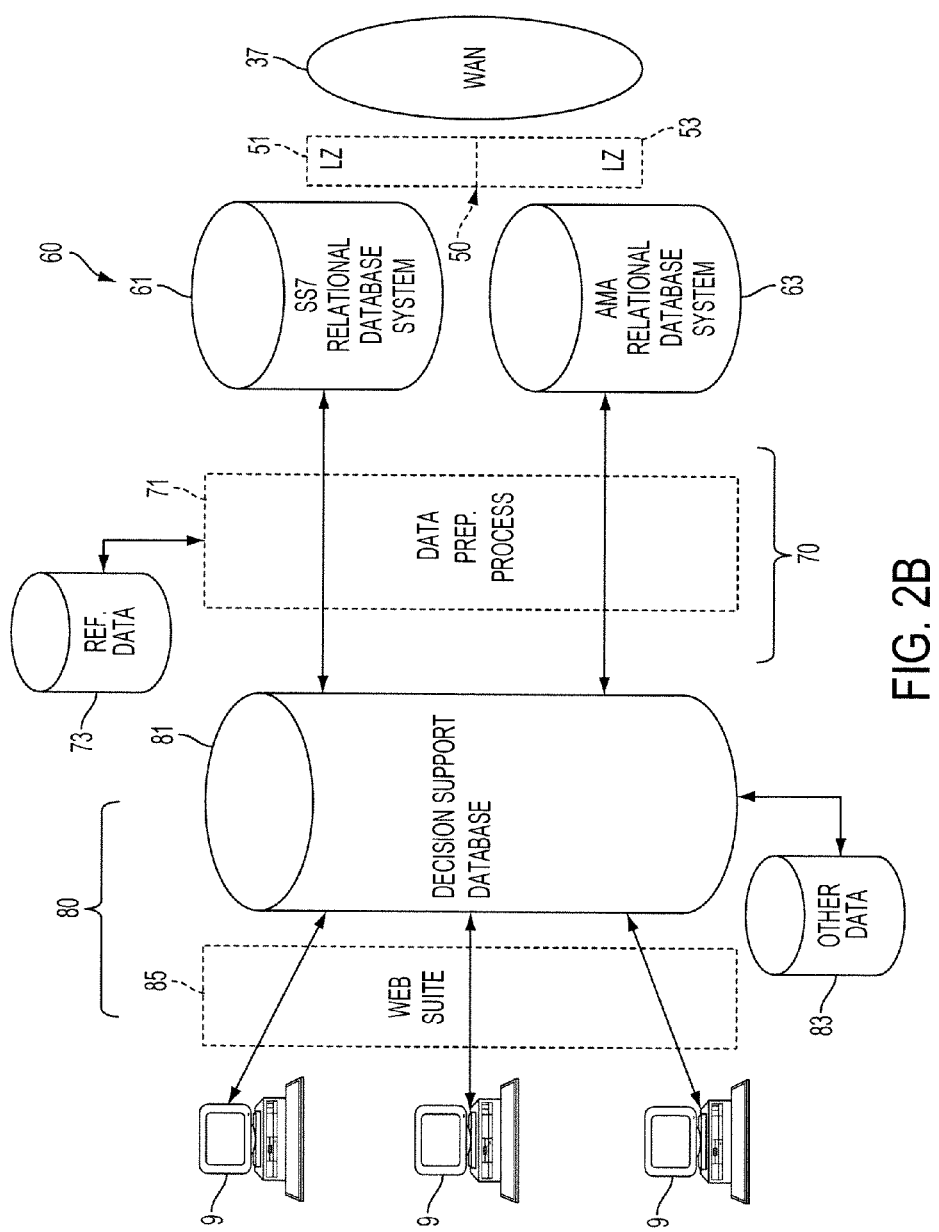

As shown by the above discussion, functions relating to enriching CDR with external data may be implemented on computers connected for data communication via the components of a packet data network, operating as the database system 61, the data processor 71, and the decision support database 80 as shown in FIG. 2B. Although special purpose devices may be used, such devices also may be implemented using one or more hardware platforms intended to represent a general class of data processing device commonly used to run "server" programming so as to implement the enrichment and reporting functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for enriching the call records. The software code is executable by the general-purpose computer that functions as the data preparation process 71 on a server device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for enriching the call records with external data, in essentially the manner performed in the implementations discussed and illustrated herein.

Figure 8:
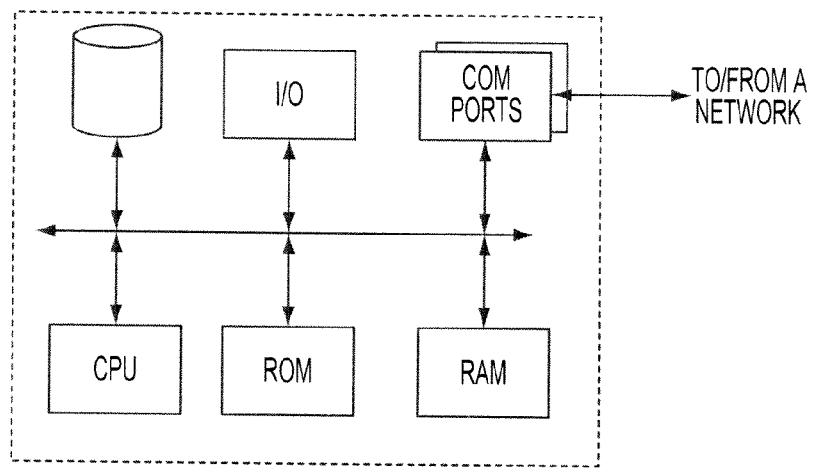
FIG. 8 illustrates a network or host computer platform, as may typically be used to implement a server.
Figure 9:
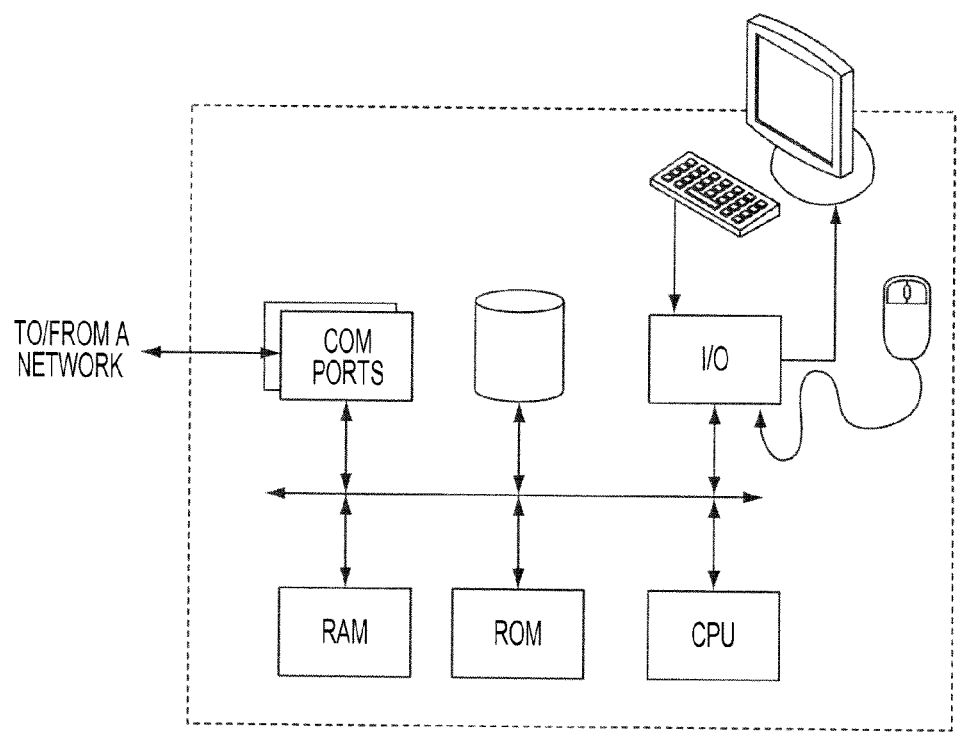
FIG. 9 depicts a computer with user interface elements, as may be used to implement a personal computer or other type of workstation or terminal device.

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer or other type of work station or terminal device, although the computer of FIG. 9 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 9). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of enriching call records with LERG, LNP, VoIP and Locality information outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the telephone service provider into the computer platform of running the data preparation process 71. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the reference database 73 shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, at a processor, call records from telecommunication network and loading the call records into a telephone number (TN) list;
   obtaining, from a reference database, Local Routing Number (LRN) data identifying ported numbers and applying the LRN data to the call records to enrich the call records with ported information;
   obtaining, from the reference database, Local Exchange Routing Guide (LERG) data associated with the LRN data and applying the LERG data to the call records to enrich the call records with LERG information, wherein enriching the call records with the LERG information includes using call records enrichment fields to enrich the call records with the LERG information;
   distinguishing an originating carrier from a routing carrier for the call records based on the LERG information enriching the call records, the originating carrier being a carrier originating a call and passing the call to the routing carrier for delivery to a next destination of the call;
   distinguishing a terminating carrier from the routing carrier for the call records based on the LERG information enriching the call records, the terminating carrier receiving the call from the routing carrier and terminating the call;
   assigning ownership to the call records based on the originating carrier and the terminating carrier; and
   setting a transit flag for the call records in the TN list using the LERG information,
   wherein for calls from a Competitive Local Exchange Carrier (CLEC) or an Independent Local Exchange Carrier (ILEC) to a Local Exchange Carrier (LEC), the transit flag is set in accordance with following logic rules:
   (1) when an Interexchange Carrier ID Code (CIC) is present in a call, the call is a transit call and the transit flag is set to true;
   (2) when the CIC Code is not present in the call and a Terminating Number (TNUM) is not associated with the LEC, the call is a transit call and the transit flag is set to true; and
   (3) when the CIC Code is not present in the call and the TNUM is associated with the LEC, the call is not a transit call and the transit flag is set to false.

2. The method of claim 1, wherein receiving the call records includes receiving Signaling System Seven (SS7) Call Detail Records (CDRs) received from Signal Transfer Points (STPs) for interoffice calls from central office switches of the network for intra-office calls.

3. The method of claim 1, wherein the ported information includes the LRN associated with ported calls in the TN list.

4. The method of claim 1, wherein the LERG data includes state, LATA, rate center, and carrier name associated with the LRN.

5. The method of claim 1, wherein distinguishing the originating carrier from the routing carrier includes using the call records enriched with the LERG information to identify an Originating Number (ONUM) for a call from the CLEC to the LEC and assigning the originating carrier to an owner of the ONUM.

6. The method of claim 5, wherein the ONUM for the call is assigned in accordance with following logic rules:

(1) if a valid forwarding number is present in the call and the forwarding number is found in a Local Number Portability (LNP) database, the ONUM is an LRN associated with the forwarding number;
(2) if a valid forwarding number is present in the call and the forwarding number is not found in the LNP database, the ONUM is the forwarding number;
(3) if a valid forwarding number is not present in the call and a valid calling number is present in the call and in the LNP database, the ONUM is an LRN associated with the calling number;
(4) if a valid forwarding number is not present in the call and a valid calling number is present in the call and not present in the LNP database, the ONUM is the calling number;
(5) if neither a valid forwarding number nor a valid calling number are present in the call and a valid charge number is present in the call and in the LNP database, the ONUM is an LRN associated with the charge number;
(6) if neither a valid forwarding number nor a valid calling number are present in the call and a valid charge number is present in the call and not present in the LNP database, the ONUM is the charge number;
(7) if no valid forwarding number, no valid calling number, and no valid charge number are present in the call and a valid Jurisdictional Information Parameter (JIP) number is present, the ONUM is the JIP number; and
(8) if no valid forwarding number, no valid calling number, no valid charge number and no valid JIP are present in the call, the ONUM is set to null.

7. The method of claim 1, wherein for calls from the LEC to the CLEC or the ILEC, the transit flag is set in accordance with following logic rules:
   (1) if an ONUM is not associated with the LEC, the call is a transit call and the transit flag is set to true; and
   (2) if the ONUM is associated with the LEC, the call is not a transit call and the transit flag is set to false.

8. The method of claim 1, further comprising:
   obtaining, from the reference database, Voice over IP (VoIP) data identifying Verizon VoIP numbers and applying the VoIP data to the call records to enrich the call records with VoIP information; and
   obtaining, from the reference database, VoIP data identifying non-Verizon numbers based on ONUM or TNUM switch type as determined from LERG7, LERG7SHA, and/or Telecordia documentation.

9. The method of claim 1, further comprising assigning jurisdiction to the call records based on whether or not a Dialing (DG) number and a Dialed (DD) number associated with each of the call records are assigned to rate centers that are determined to be in same local calling area.

10. The method of claim 9, the DG number for the call is assigned in accordance with following logic rules:
   (1) if a valid forwarding number is present, the DG number is the valid forwarding number regardless of whether or not the forwarding number is ported;
   (2) if a valid forwarding number is not present and a valid calling number is present in the call, the DG is the calling number regardless of whether or not the calling number is ported;
   (3) if neither a valid forwarding number nor a valid calling number are present in the call and a valid charge number is present in the call, the DG is the charge number regardless of whether or not the charge number is ported;

(4) if no valid forwarding number, no valid calling number, and no valid charge number are present in the call and a valid JIP number is present, the DG is the JIP number; and (5) if no valid forwarding number, no valid calling number, no valid charge number and no valid JIP are present in the call, the DG is set to null.

11. The method of claim 9, the DD number for the call is assigned in accordance with following logic rules:
(1) if the call has been LNP dipped by a network and found ported, DD is Generic Address Parameter (GAP) if the GAP is a 10 digit number;
(2) if the call has been LNP dipped by the network and found ported, DD is the Enriched Called Number if the GAP is a 7 digit number;
(3) if the call has been LNP dipped by the network and found to be not ported, DD is the Called Number if the Called Number is a 10 digit number;
(4) if the call has been LNP dipped by the network and found to be not ported, DD is the Enriched Called Number if the Called Number is a 7-digit number;
(5) if the call has not been LNP dipped by the network, the Called Number is looked up in the LNP data and if found ported, DD is the LRN of the Called Number;
(6) if the call has not been LNP dipped by the network, the Called Number is looked up in the LNP data and if not found ported, DD is the Called Number if the Called Number is a 10 digit number; and
(7) if the call has not been LNP dipped by the network, the Called Number is looked up in the LNP data and if not found ported, DD is the Enriched Called Number if the Called Number is a 7 digit number.

12. The method of claim 1, wherein distinguishing the terminating carrier from the routing carrier includes using the call records enriched with the LERG information to identify a Terminating Number (TNUM) and assigning the terminating carrier to an owner of the TNUM.

13. The method of claim 12, wherein the TNUM for the call is assigned in accordance with following logic rules:
(1) if the call has been LNP dipped and found to be ported, the TNUM is a number appearing in a Called Number filed associated with the call, the number being the LRN associated with the call;
(2) if the call has been LNP dipped and found to be not ported, the TNUM is a Called Number if the Called Number is a 10 digit number;
(3) if the call has been LNP dipped and found to be not ported, the TNUM is the Enriched Called Number if the Called Number is a 7 digit number, the Enriched Called Number may include NPA information;
(4) if the call has not been LNP dipped by the network, the Called Number is looked up in the LNP reference data and if found to be ported, the LRN is used for the TNUM;
(5) if the call has not been LNP dipped by the network, the called number is looked up in the LNP reference data and if found not to be ported, the Called Number is used for the TNUM if the Called Number is a 10 digit number; and
(6) if the call has not been LNP dipped by the network, the Called Number is looked up in the LNP reference data and if found not to be ported, the Enriched Called Number is used for the TNUM if the Called Number is a 7 digit number.

14. A server comprising:
a processor; and
a memory storing executable instructions for causing the processor to:
receive call records from telecommunication network and loading the call records into a telephone number (TN) list;
obtain, from a reference database, LRN data identifying ported numbers and applying the LRN data to the call records to enrich the call records with ported information;
obtain, from the reference database, LERG data associated with the LRN data and applying the LERG data to the call records to enrich the call records with LERG information, wherein enriching the call records with the LERG information includes using call records enrichment fields to enrich the call records with the LERG information;
distinguish an originating carrier from a routing carrier for the call records based on the LERG information enriching the call records, the originating carrier being a carrier originating a call and passing the call to the routing carrier for delivery to a next destination of the call;
distinguish a terminating carrier from the routing carrier for the call records based on the LERG information enriching the call records, the terminating carrier receiving the call from the routing carrier and terminating the call;
assign ownership to the call records based on the originating carrier and the terminating carrier; and
set a transit flag for the call records in the TN list using the LERG information,
wherein for calls from a CLEC or an ILEC to a LEC, the transit flag is set in accordance with following logic rules:
(1) when an CIC is present in a call, the call is a transit call and the transit flag is set to true;
(2) when the CIC Code is not present in the call and a TNUM is not associated with the LEC, the call is a transit call and the transit flag is set to true; and
(3) when the CIC Code is not present in the call and the TNUM is associated with the LEC, the call is not a transit call and the transit flag is set to false.

* * * * *